(12) United States Patent
Lussey et al.

(10) Patent No.: US 9,182,845 B2
(45) Date of Patent: Nov. 10, 2015

(54) SENSOR

(75) Inventors: David Lussey, Tunstall (GB); Mark Andrew Graham, Middlesborough (GB)

(73) Assignee: Peratech Holdco Limited, Brompton-on-Swale, Richmond, North Yorkshire (GB)

( * ) Notice: Subject to any disclaimer, the term of this patent is extended or adjusted under 35 U.S.C. 154(b) by 813 days.

(21) Appl. No.: 13/259,471

(22) PCT Filed: Mar. 24, 2010

(86) PCT No.: PCT/GB2010/000546
§ 371 (c)(1),
(2), (4) Date: Feb. 6, 2012

(87) PCT Pub. No.: WO2010/109186
PCT Pub. Date: Sep. 30, 2010

(65) Prior Publication Data
US 2012/0120009 A1    May 17, 2012

(30) Foreign Application Priority Data
Mar. 25, 2009 (GB) .................... 0905037.8

(51) Int. Cl.
*G06F 3/041* (2006.01)
*H01C 10/10* (2006.01)

(52) U.S. Cl.
CPC .................... *G06F 3/0414* (2013.01)

(58) Field of Classification Search
CPC .................................... G06F 3/0414
USPC ........................................... 345/173; 338/47
See application file for complete search history.

(56) References Cited

U.S. PATENT DOCUMENTS

| | | | |
|---|---|---|---|
| 4,258,100 A * | 3/1981 | Fujitani et al. | 428/316.6 |
| 4,556,860 A * | 12/1985 | Tobias et al. | 338/22 SD |
| 4,570,149 A * | 2/1986 | Thornburg et al. | 338/114 |
| 5,159,159 A * | 10/1992 | Asher | 178/18.05 |
| 6,210,771 B1 * | 4/2001 | Post et al. | 428/100 |

(Continued)

FOREIGN PATENT DOCUMENTS

EP     1887595 A1    2/2008

OTHER PUBLICATIONS

Petersen, E. Touchscreens Find a Home in the Factory Floor, Control Solutions. Pennwell Pulishing, Tulsa, OK, vol. 64, No. 5; Jan. 5, 1991, pp. 59-62, 67.

(Continued)

*Primary Examiner* — Amare Mengistu
*Assistant Examiner* — Benyam Ketema
(74) *Attorney, Agent, or Firm* — Arthur Jacob

(57) ABSTRACT

A sensor for, and a method of, generating electrical signals indicating a positional property and an extent property of a mechanical interaction within a sensing zone. The sensor comprises a plurality of conductive layers. At least one conductive layer is a pressure-sensitive conductive layer comprising a quantum tunnelling conductance (qtc) material. Contact between conductive layers is allowed during the absence of a mechanical interaction within said sensing zone. The sensor may be configured to provide a three-terminal sensing functionality or a four-terminal sensing functionality. The sensing zone may be substantially two-dimensional or substantially three-dimensional. The sensor may be substantially flexible or substantially rigid.

12 Claims, 26 Drawing Sheets

(56) References Cited

U.S. PATENT DOCUMENTS

| | | | |
|---|---|---|---|
| 6,646,540 B1* | 11/2003 | Lussey | 338/47 |
| 7,093,499 B2* | 8/2006 | Baudendistel | 73/779 |
| 8,089,336 B2* | 1/2012 | Burkitt | 338/101 |
| 2004/0252007 A1* | 12/2004 | Lussey et al. | 338/47 |
| 2007/0085553 A1* | 4/2007 | Keroe et al. | 324/713 |
| 2009/0189877 A1* | 7/2009 | Washino et al. | 345/174 |
| 2009/0322700 A1* | 12/2009 | D'Souza et al. | 345/174 |
| 2011/0034421 A1* | 2/2011 | Miller et al. | 514/118 |

OTHER PUBLICATIONS

Schulz, R.S. Touch Screen Applications. Electronic Engineering, Morgan-Grampian Ltd., London, GB, vol. 71, No. 867, Apr. 1, 1999.

* cited by examiner

SENSOR

CROSS REFERENCE TO RELATED APPLICATIONS

This application of 35 U.S.C. §371 to PCT/GB2010/000546, filed on Mar. 24, 2010, which claims priority of United Kingdom application No. GB 09 05 037.8, filed 25 Mar. 2009, the contents of which are included herein by reference.

BACKGROUND OF THE INVENTION

1. Field of the Invention

The present invention relates to a sensor for generating electrical signals indicating properties of a mechanical interaction within a sensing zone, and a method of generating electrical signals indicating properties of a mechanical interaction within a sensing zone of a sensor.

2. Description of the Related Art

United Kingdom Patent No. 2 365 532, in the name of the present applicant, discloses a flexible alphanumeric keyboard fabricated from textile fabrics. The construction of the flexible alphanumeric keyboard utilises first and second textile fabric conductive layers. The document teaches the provision of separating means to ensure that the first and second conductive textile fabric layers are normally spaced apart, yet to allow the first and second conductive layers to make contact during a mechanical interaction.

U.S. Pat. No. 5,943,044, in the name of Martinelli et al, discloses a touchpad assembly and method for generating signals indicative of the location and applied pressure of an object touching the touchpad. The assembly of the touchpad includes X and Y position and pressure sensitive semiconductor resistance sensor layers. The position sensor layers are arranged to come into contact at a contact point when the object touches the touchpad.

Problems have been found with sensors that utilise separating means between first and second conductive layers. A production problem with this type of sensor is that a manufacturing overhead exists due to the requirement to provide reliable separating means. A post-production problem with this type of sensor is that false triggering may destroy the functionality of the sensor. These problems are particular prevalent with sensors that are configured to allow a degree of flexing, since the functionality of the separating means tends to degrade more quickly than more rigid sensors.

BRIEF SUMMARY OF THE INVENTION

According to a first aspect of the present invention, there is provided a sensor for generating electrical signals indicating a positional property and an extent property of a mechanical interaction within a sensing zone, said sensor comprising a plurality of conductive layers, that comprises at least: a first conductive layer having a first conductive area having a first electrical terminal and a second electrical terminal in electrical connection therewith and configured to allow an electrical potential gradient to be established between said first electrical terminal and said second electrical terminal, in a first direction, and a second conductive layer having a second conductive area having a third electrical terminal in electrical connection therewith; and said sensor is configured such that an electrical path is established between said first conductive area and said second conductive area during a mechanical interaction within said sensing zone; at least one of said plurality of conductive layers is a pressure-sensitive conductive layer comprising a quantum tunnelling conductance(qtc) material, and said sensor is configured such that contact between conductive layers is allowed during the absence of a mechanical interaction within said sensing zone.

According to a second aspect of the present invention, there is provided a sensor according to the first aspect of the invention described above, wherein said third electrical terminal is a sheet terminal.

According to a third aspect of the present invention, there is provided a sensor according to the first aspect of the invention described above, wherein said second conductive area has a fourth electrical terminal connected thereto and is configured to allow an electrical potential gradient to be established between said third electrical terminal and said fourth electrical terminal, in a second direction that is substantially perpendicular to said first direction.

According to a fourth aspect of the present invention, there is provided a method of generating electrical signals indicating a positional property and an extent property of a mechanical interaction within a sensing zone of a sensor, comprising the steps of: receiving a sensor according to the first aspect of the invention described above, establishing an electric potential gradient across said first conductive layer, between said first electrical terminal and said second electrical terminal, in said first direction, receiving a first voltage from said third electrical terminal, to produce a first positional value, processing said first positional value to produce a first positional property of a mechanical interaction, establishing an electric potential from one of said first electrical terminal and said second electrical terminal of said first conductive layer, to produce a first current, measuring said first current from said third electrical terminal of said second conductive layer, to produce a first current value, establishing an electric potential from the other of said first electrical terminal and said second electrical terminal of said first conductive layer, to produce a second current, measuring said second current from said third electrical terminal of said second conductive layer, to produce a second current value, and processing said second current value in combination with said first current value to produce an extent property of a mechanical interaction.

According to a fifth aspect of the present invention, there is provided a method of generating electrical signals indicating a positional property and an extent property of a mechanical interaction within a sensing zone of a sensor, comprising the steps of: receiving a sensor according to the third aspect of the invention described above, establishing an electric potential gradient across said first conductive layer, between said first electrical terminal and said second electrical terminal, in said first direction, receiving a first voltage from one of said third electrical terminal and said fourth electrical terminal of said second conductive layer, to produce a first positional value, processing said first positional value to produce a first positional value of a mechanical interaction, establishing an electric potential gradient across said second conductive layer, between said third electrical terminal and said fourth electrical terminal, in said second direction, receiving a second voltage from one of said first electrical terminal and said second electrical terminal of said first conductive layer, to produce a second positional value, processing said second positional value to produce a second positional value of a mechanical interaction, establishing an electric potential from one of said first electrical terminal and said second electrical terminal of said first conductive layer, to produce a first current, measuring said first current from one of said third electrical terminal and said second electrical terminal of said second conductive layer, to produce a first current value, establishing an electric potential from the other of said first electrical terminal and said second electrical terminal of said first conductive layer, to produce a second current, measuring said second current from the other of said third electrical terminal and said fourth electrical terminal of said second conductive layer, to produce a second current value, and processing said second current value in combination with said first current value to produce an extent property of a mechanical interaction.

DESCRIPTION OF THE BEST MODE FOR CARRYING OUT THE INVENTION

FIG. 1

Figure 1:
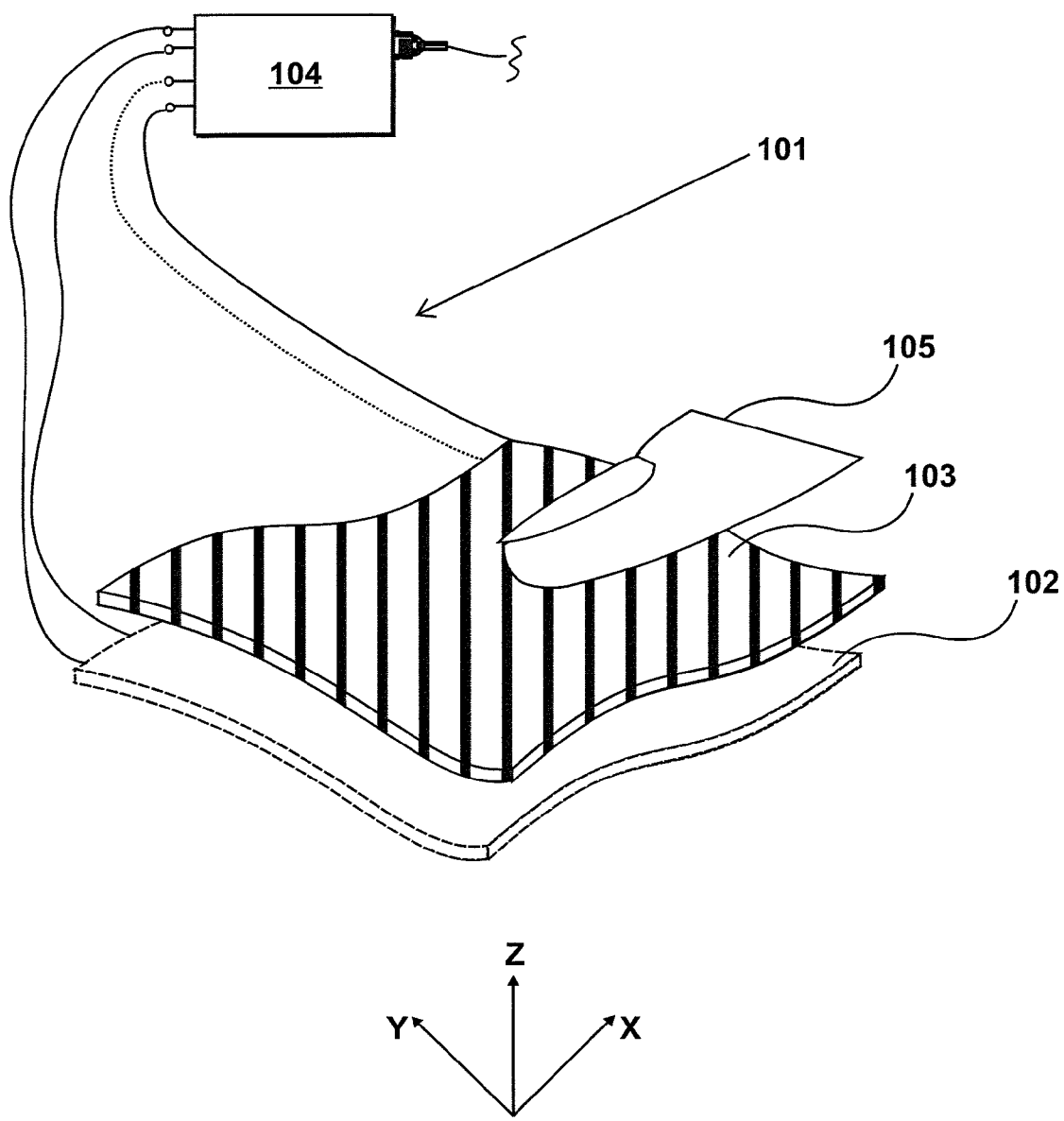
FIG. 1 illustrates a sensor for generating electrical signals indicating a positional property and an extent property of a mechanical interaction within a sensing zone.

FIG. 1 illustrates a sensor 101 for generating electrical signals indicating a positional property and an extent property of a mechanical interaction within a sensing zone. Sensor 101 comprises a plurality of conductive layers that comprises at least a first conductive layer 102 and a second conductive layer 103. At least one of the plurality of conductive layers is a pressure sensitive conductive layer comprising a quantum tunnelling conductance (qtc) material. Descriptions of examples of quantum tunnelling conductance (qtc) material materials can be found in U.S. Pat. Nos. 6,291,568 and 6,495,069 each in the name of the present applicant. The sensor is configured such that contact between conductive layers is allowed during the absence of a mechanical interaction within the sensing zone.

As will be described in further detail below, the plurality of conductive layers of the sensor is provided with an arrangement of electrical terminals (not shown in this Figure). The electrical terminals may be arranged to provide the sensor with a three-terminal sensing arrangement, to allow a single positional value and an extent value of a mechanical interaction to be determined. In Cartesian co-ordinates, a three-terminal sensing arrangement allows a measurement in the X-axis or Y-axis direction, along with a measurement in the Z-axis direction. The electrical terminals may be arranged to provide the sensor with a four-terminal sensing arrangement, to allow first and second positional values and an extent value of a mechanical interaction to be determined. In Cartesian co-ordinates, a four-terminal sensing arrangement allows a measurement in the X-axis direction and the Y-axis direction, along with a measurement in the Z-axis direction.

Sensor 101 may therefore comprise an electrical interface device 104 in electrical connection with the electrical terminals of the plurality of conductive layers. Sensor 101 is configured to respond to a mechanical actuator. In an embodiment, the sensor is configured to be responsive to actuation by a finger 105.

FIG. 2

Figure 2:
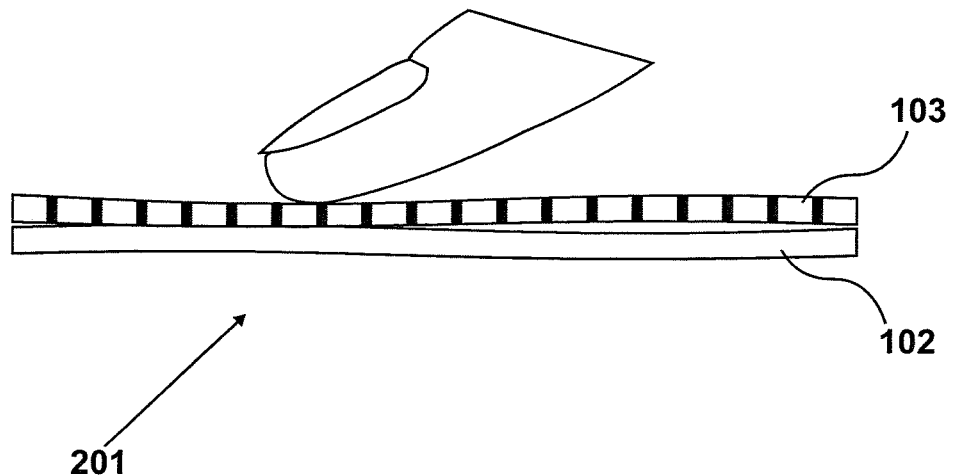
FIG. 2 illustrates features of a physical arrangement of a plurality of conductive layers.
Figure 2:
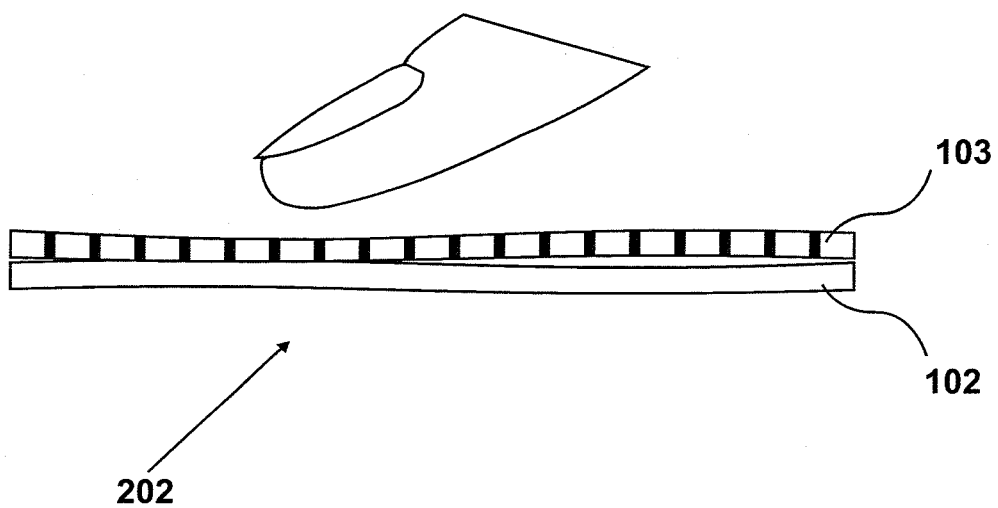

FIG. 2 illustrates features of a physical arrangement of conductive layers 102 and 103 of FIG. 1.

During the absence of a mechanical interaction, the conductive layers are considered to be in a rest condition. During a mechanical interaction, the conductive layers are considered to be in a deformed condition.

An instance of a mechanical interaction is shown at 201. During the mechanical interaction, the first and second conductive layers 102, 103 are in physical contact. An instance of an absence of a mechanical interaction is shown at 202. During the absence of a mechanical interaction, the first and second conductive layers 102, 103 may or may not be in physical contact. Any contact between the first and second conductive layers during the absence of a mechanical interaction is due to the topography of these layers when in the rest condition.

According to this illustrated example, second conductive layer 103 comprises a quantum tunnelling conductance (qtc) material. The qtc material is deformation-responsive in that the qtc material has a resistance in a particular direction and for a particular degree of deformation in that particular direction, and a change of resistance is exhibited in response to a change of degree of deformation in that direction. The qtc material may be modelled as a variable resistor, with current flow dependent upon degree of compression, tension or torsion. Under applied force, the resistance of the QTC material drops controllably and repeatably.

A conductive layer comprising a qtc material is herein termed a "qtcm layer". A qtcm layer is considered to have a planar resistance, in Cartesian co-ordinates in the X-axis and the Y-axis directions, and a depth resistance, in Cartesian co-ordinates in the Z-axis direction.

A conductive layer has a component of resistance across the layer and a component of resistance through that conductive layer. During a mechanical interaction within the sensing zone of the sensor, the qtcm layer experiences deformation that results in a local change in the planar resistance and in the depth resistance. The qtcm layer is pressure-responsive in that a change of depth resistance is exhibited at the site of a mechanical interaction, in response to that mechanical interaction. The qtc material can be provided that has a rest condition depth resistance that is high enough to inhibit current flow yet has a deformed condition depth resistance that is low enough to enable measurements of current flow.

The qtc material may thus be modelled as an insulator when in the at rest condition and as a conductor when in the deformed condition. In an example, a qtc material has a resistance of 1M ohm when in the rest condition, but is able to display a resistance of below 10 k ohm when in a deformed condition. It is to be understood that the particular qtc material for use in a sensor having the construction described herein should be chosen to provide the desired degree of sensitivity required in order to detect the mechanical interactions that are to be detected by the sensor.

The electrical characteristics of a qtc material is such that a qtcm layer is utilisable within a sensor in a conductive layer arrangement that allows the qtcm layer to be in physical contact with another conductive layer when the sensor is in the rest condition. Advantages provided by this feature are discussed throughout.

An advantage of this feature is that it removes any requirement to provide separating means between the qtcm layer and another conductive layer. Separating layers utilised in prior art sensors are typically provided by an air gap, by an arrangement of insulating nodes such as may be provided by a mesh or a pattern of individual elements. Clearly, the step of providing a separator layer during the manufacture of the sensor may be omitted. This allows for cost savings in the construction of the sensor, through a reduction in one or more of: materials used in the manufacturing process, complexity of the manufacturing process, duration of the manufacturing process, post-manufacture testing. In addition, the omission of a separator layer provides for a relative reduction in the overall thickness of a particular plurality of conductive layers. In turn, this allows for a reduction in the dimensions of an item, for example a mobile telephone, into which the sensor is fitted.

Without a separating layer, force applied during a mechanical interaction is transmitted more directly through the sensor than it is in a prior art sensor. Thus, a sensor that does not include a separating layer between the qtcm layer and another conductive layer is particularly useful in applications in which it is anticipated that the mechanical interactions to be detected will cause a relatively small deflection.

FIG. 3

Figure 3:
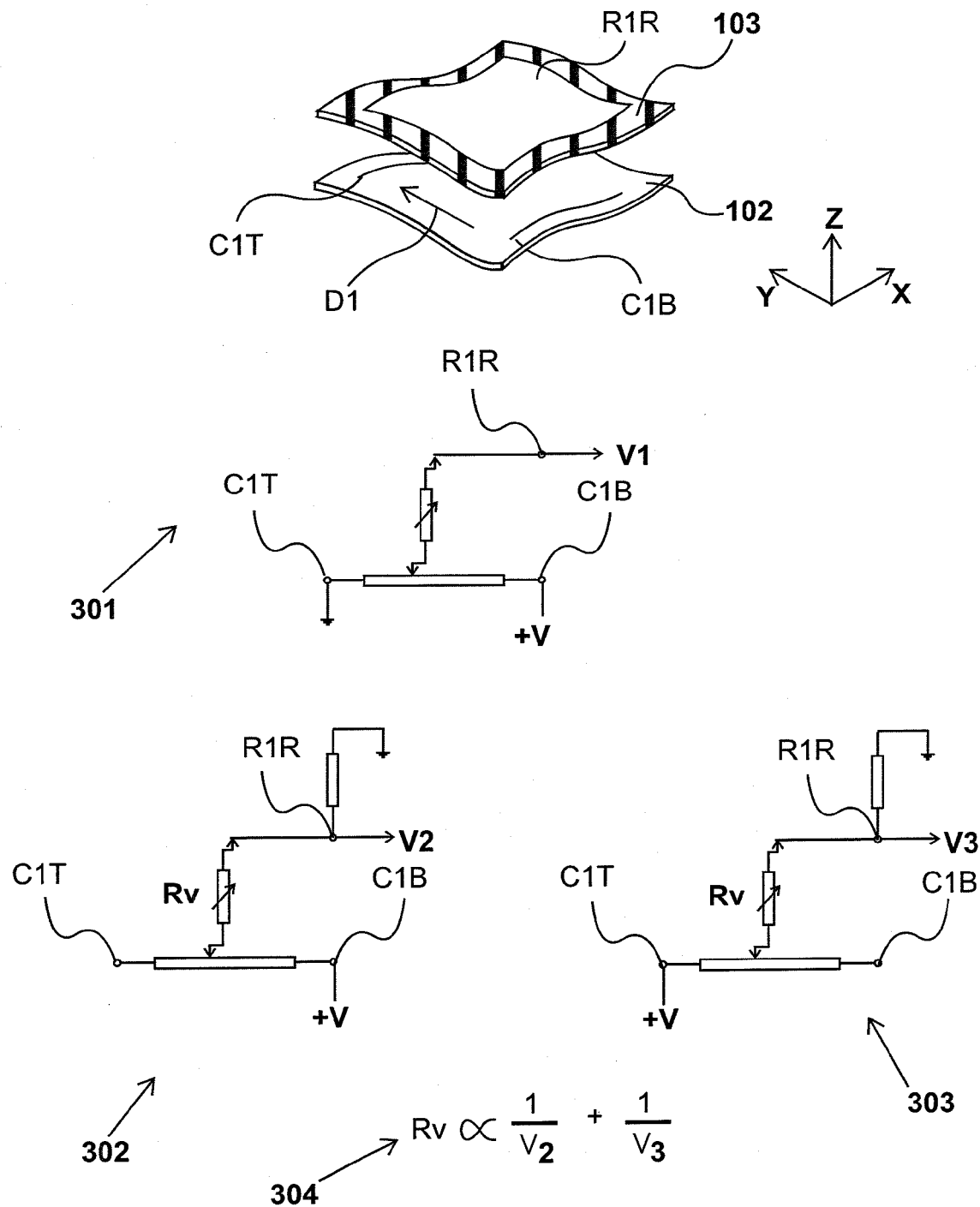
FIG. 3 shows a three-terminal electrical configuration for providing a sensor with functionality for indicating a positional property and an extent property of a mechanical interaction.

FIG. 3 illustrates a three-terminal electrical configuration for providing a sensor with functionality for indicating a positional property and an extent property of a mechanical interaction. A first conductive layer 102 has a first conductive area having a first electrical terminal C1B and a second electrical terminal C1T in electrical connection therewith, and configured to allow an electrical potential gradient to be established between them in a first direction D1. A second conductive layer 103 has a second conductive area having a third electrical terminal R1R in electrical connection therewith. As shown in FIG. 3, the first electrical terminal C1B and the second electrical terminal C1T of first conductive layer 102 are each line terminals whilst the third electrical terminal R1R of second conductive layer 103 is a sheet terminal. Arrangements for determining a positional property and an extent property of a mechanical interaction are illustrated at 301 and 302, 303 and 304 respectively. At 301, 302 and 303, first conductive layer 102 is represented schematically as a potentiometer and the resistance of the conductive path between the first and second conductive layers 102, 103 is represented schematically as a variable resistor Rv.

In the arrangement of 301, a positive voltage is applied to the electrical terminal C1B of first conductive layer 102 whilst the other electrical terminal C1T of first conductive layer 102 is grounded, thereby establishing an electrical potential gradient between them, in direction D1. During a mechanical interaction, a voltage from the first conductive layer 102 is applied to the second conductive layer 103 at the site of the mechanical interaction. A measurement of voltage may be made from the electrical terminal R1R of second conductive layer 103, thereby providing a voltage V1. V1 is directly proportional to the distance of the centre of the mechanical interaction from the electrical terminal R1R of the second conductive layer 103. Thus, a positional property of the mechanical interaction may be derived from V1. It is to be appreciated that the roles of the electrical terminals of the first conductive layer 102 in the arrangement of 301 may be reversed.

In the arrangement of 302, a positive voltage is applied to the electrical terminal C1B of first conductive layer 102 whilst the other electrical terminal C1T of first conductive layer 102 is disconnected. During a mechanical interaction, a current flows from the electrical terminal C1B of the first conductive layer 102, to the electrical terminal R1R of the second conductive layer 103, through the site of the mechanical interaction. The electrical terminal R1R of second conductive layer 103 is connected to ground via a resistor of a known value. A measurement of voltage may be made from the electrical terminal R1R of second conductive layer 103, thereby providing a voltage V2. V2 represents the voltage drop across the resistor of a known value and is directly proportional to the current flowing between the electric terminal C1T of the first conductive layer 102 and the electrical terminal R1R of the second conductive layer 103 during the mechanical interaction.

In the arrangement of 303, a positive voltage is applied to the electrical terminal C1T of first conductive layer 102 whilst the other electrical terminal C1B of first conductive layer 102 is disconnected. The electrical terminal R1R of second conductive layer 103 is connected to ground via a resistor of a known value. During a mechanical interaction, a current flows from the first electrical terminal C1T of the first conductive layer 102, to the electrical terminal R1R of the second conductive layer 103, through the site of the mechanical interaction. A measurement of voltage may be made from the electrical terminal R1R of second conductive layer 103, thereby providing a voltage V3. V3 represents the voltage drop across the resistor of a known value and is directly proportional to the current flowing between the electric terminal C1B of the first conductive layer 102 and the electrical terminal R1R of the second conductive layer 103 during the mechanical interaction.

As shown at 304, a relationship exists between the resistance Rv of the conductive path through the first and second conductive layers 102, 103 during a mechanical interaction and the measured voltages V2 and V3. The resistance Rv is proportional to the sum of the reciprocal of V2 and the reciprocal of V3. The resistance Rv of the conductive path through the first and second conductive layers 102, 103 during a mechanical interaction is dependent upon the magnitude of applied force or applied pressure of mechanical interaction and the area of mechanical interaction. Thus, an extent property of the mechanical interaction may be derived from V2 and V3.

In an alternative arrangement of a three-terminal electrical configuration for the same conductive areas of the first and second conductive layers 102 and 103, the first and second electrical terminals C1B, C1T of first conductive layer 102 and the third electrical terminal R1R of second conductive layer 103 are each line terminals. When providing the second conductive layer 103 with a line terminal instead of a sheet terminal, it is found that the sensitivity of the sensing arrangement to a mechanical interaction will increase as the distance of the mechanical interaction from the line terminal decreases, hence this effect must be compensated.

FIG. 4

Figure 4:
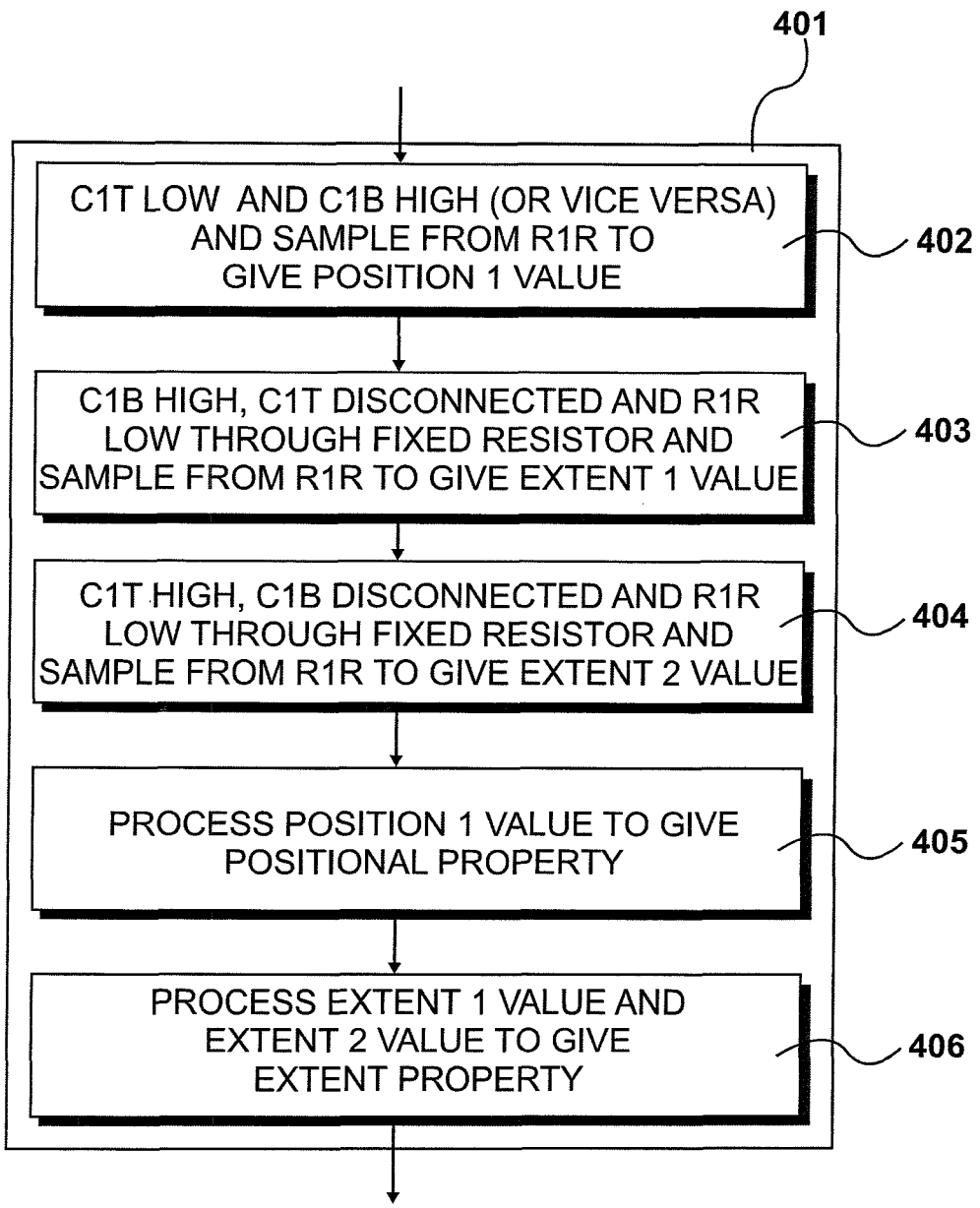
FIG. 4 shows steps in a procedure for generating a positional property and an extent property of a mechanical interaction with a sensor having a three-terminal electrical configuration as described with reference to FIG. 3.

FIG. 4 shows steps in a procedure 401 for generating a positional property and an extent property of a mechanical interaction with a sensor having the three-terminal electrical configuration of FIG. 3.

At step 402, the electrical arrangement of 301 of FIG. 3 is executed and a V1 measurement is made, to give a first positional value. At step 403, the electrical arrangement of 302 of FIG. 3 is executed and a V2 measurement is made, to give a first extent value. At step 404, the electrical arrangement of 303 of FIG. 3 is executed and a V3 measurement is made, to give a first extent value. At step 405, the first positional value is processed to give a positional property. This step may however be performed at any time after 402. At step 406, the first extent value and the second extent value are processed in combination to give an extent property. This step may however be performed at any time after steps 403 and 404.

FIG. 5

Figure 5:
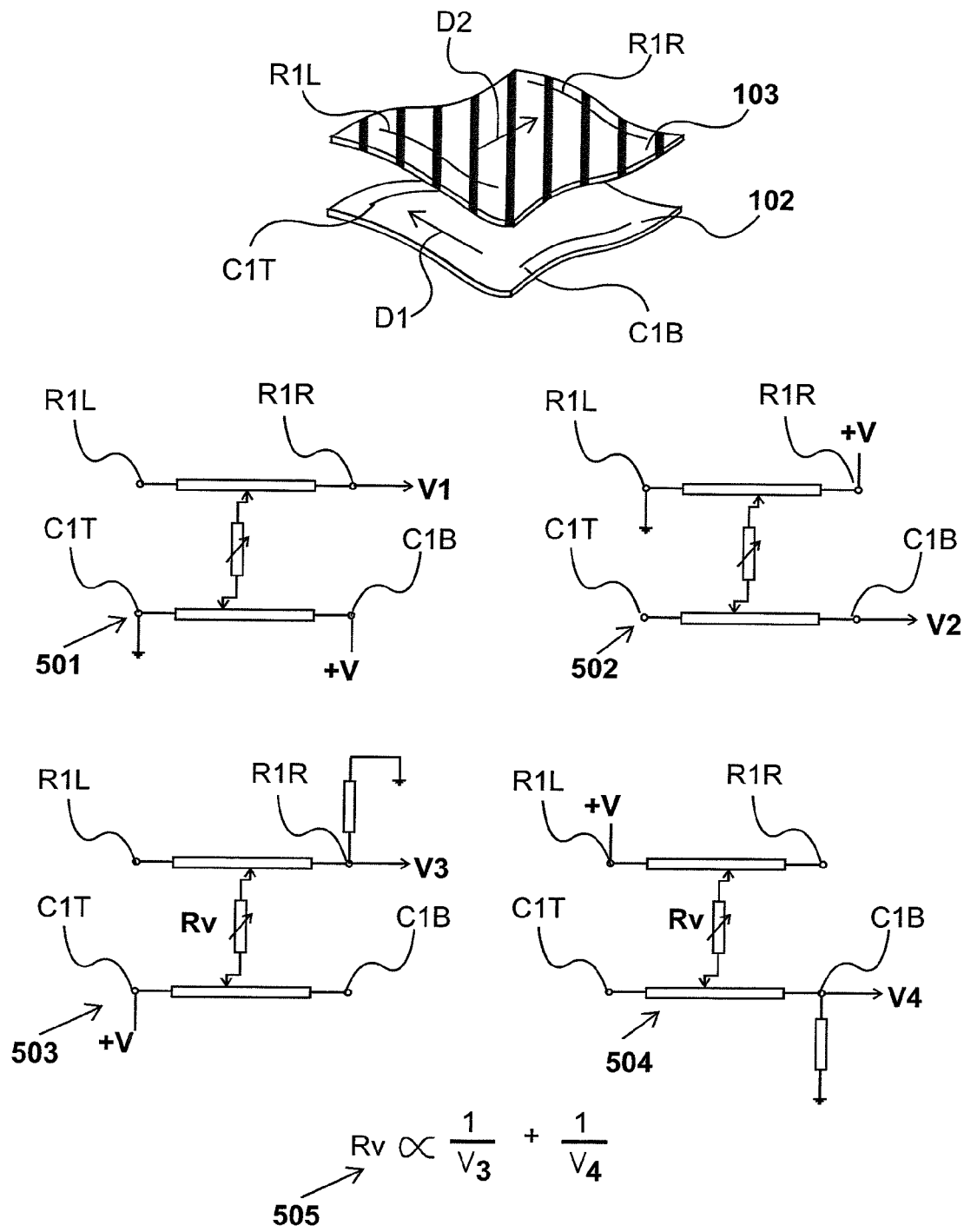
FIG. 5 illustrates a four-terminal electrical configuration for providing a sensor with functionality for indicating first and second positional properties and an extent property of a mechanical interaction.

FIG. 5 illustrates a four-terminal electrical configuration for providing a sensor with functionality for indicating first and second positional properties and an extent property of a mechanical interaction. A first conductive layer 102 has a first conductive area having a first electrical terminal C1B and a second electrical terminal C1T in electrical connection therewith, and configured to allow an electrical potential gradient to be established between them in a first direction D1. A second conductive layer 103 has a second conductive area having a third electrical terminal R1R and a fourth electrical terminal R1L in electrical connection therewith, and configured to allow an electrical potential gradient to be established between them in a second direction D2. In this example, directions D1 and D2 are substantially perpendicular. As shown in FIG. 5, the first electrical terminal C1B and the second electrical terminal C1T of first conductive layer 102 and the third electrical terminal R1R and the fourth electrical terminal R1L of second conductive layer 103 are each line terminals.

Arrangements for determining first and second positional properties and an extent property of a mechanical interaction are illustrated at 501 and 502, and 503, 504 and 505 respectively. At 501, 502, 503 and 504, first and second conductive layers 102 and 103 are each represented schematically as a potentiometer and the resistance of the conductive path between the first and second conductive layers 102, 103 is represented schematically as a variable resistor Rv.

In the arrangement of 501, a positive voltage is applied to the electrical terminal C1B of first conductive layer 102 whilst the other electrical terminal C1T of first conductive layer 102 is grounded, thereby establishing an electrical potential gradient between them, in direction D1. During a mechanical interaction, a voltage from the first conductive layer 102 is applied to the second conductive layer 103 at the site of the mechanical interaction. A measurement of voltage may be made from the electrical terminal R1R of second conductive layer 103, whilst the other electrical terminal R1L of the second conductive layer 103 is disconnected, thereby providing a voltage V1. V1 is directly proportional to the distance of the centre of the mechanical interaction from the electrical terminal R1R of the second conductive layer 103. Thus, a first positional property of the mechanical interaction may be derived from V1. It is to be appreciated that the roles of the electrical terminals of the first conductive layer 102 and the roles of the electrical terminals of the second conductive layer 103 in the arrangement of 301 may be reversed.

In the arrangement of 502, a positive voltage is applied to the electrical terminal R1R of second conductive layer 103 whilst the other electrical terminal R1L of second conductive layer 103 is grounded, thereby establishing an electrical potential gradient between them, in direction D2. During a mechanical interaction, a voltage from the second conductive layer 103 is applied to the first conductive layer 102 at the site of the mechanical interaction. A measurement of voltage may be made from the electrical terminal C1B of first conductive layer 102, whilst the other electrical terminal C1T of the first conductive layer 102 is disconnected, thereby providing a voltage V2. V2 is directly proportional to the distance of the centre of the mechanical interaction from the electrical terminal C1B of the first conductive layer 102. Thus, a second positional property of the mechanical interaction may be derived from V2. It is to be appreciated that the roles of the electrical terminals of the second conductive layer 103 and the roles of the electrical terminals of the first conductive layer 102 in the arrangement of 502 may be reversed.

In the arrangement of 503, a positive voltage is applied to the electrical terminal C1T of first conductive layer 102 whilst the other electrical terminal C1B of first conductive layer 102 is disconnected. The electrical terminal R1R of second conductive layer 103 is connected to ground via a resistor of a known value, whilst the other electrical terminal R1L of second conductive layer 103 is disconnected. During a mechanical interaction, a current flows from the electrical terminal C1T of the first conductive layer 102, to the electrical terminal R1R of the second conductive layer 103, through the site of the mechanical interaction. A measurement of voltage may be made from the electrical terminal R1R of second conductive layer 103, thereby providing a voltage V3. V3 represents the voltage drop across the resistor of a known value and is directly proportional to the current flowing between the first electric terminal C1T of the first conductive layer 102 and the electrical terminal R1R of the second conductive layer 103 during the mechanical interaction. It is to be appreciated that the roles of the electrical terminals of the second conductive layer 103 and the roles of the electrical terminals of the first conductive layer 102 in the arrangement of 503 may be reversed.

In the arrangement of 504, a positive voltage is applied to the electrical terminal R1L of second conductive layer 103 whilst the other electrical terminal R1R of second conductive layer 103 is disconnected. The electrical terminal C1B of first conductive layer 102 is connected to ground via a resistor of a known value, whilst the other electrical terminal C2T of first conductive layer 102 is disconnected. During a mechanical interaction, a current flows from the electrical terminal R1L of the second conductive layer 103, to the electrical terminal C1B of the first conductive layer 102, through the site of the mechanical interaction. A measurement of voltage may be made from the electrical terminal C1B of first conductive layer 102, thereby providing a voltage V4. V4 represents the voltage drop across the resistor of a known value and is directly proportional to the current flowing between the electric terminal R1L of the second conductive layer 103 and the electrical terminal C1B of the first conductive layer 102 during the mechanical interaction. It is to be appreciated that the roles of the electrical terminals of the second conductive layer 103 and the roles of the electrical terminals of the first conductive layer 102 in the arrangement of 504 may be reversed.

As shown at 505, a relationship exists between the resistance Rv of the conductive path through the first and second conductive layers 102, 103 during a mechanical interaction and the measured voltages V3 and V4. The resistance Rv is proportional to the sum of the reciprocal of V3 and the reciprocal of V4. The resistance Rv of the conductive path through the first and second conductive layers 102, 103 during a mechanical interaction is dependent upon the magnitude of applied force or applied pressure of mechanical interaction and the area of mechanical interaction. Thus, an extent property of the mechanical interaction may be derived from V3 and V4.

FIG. 6

Figure 6:
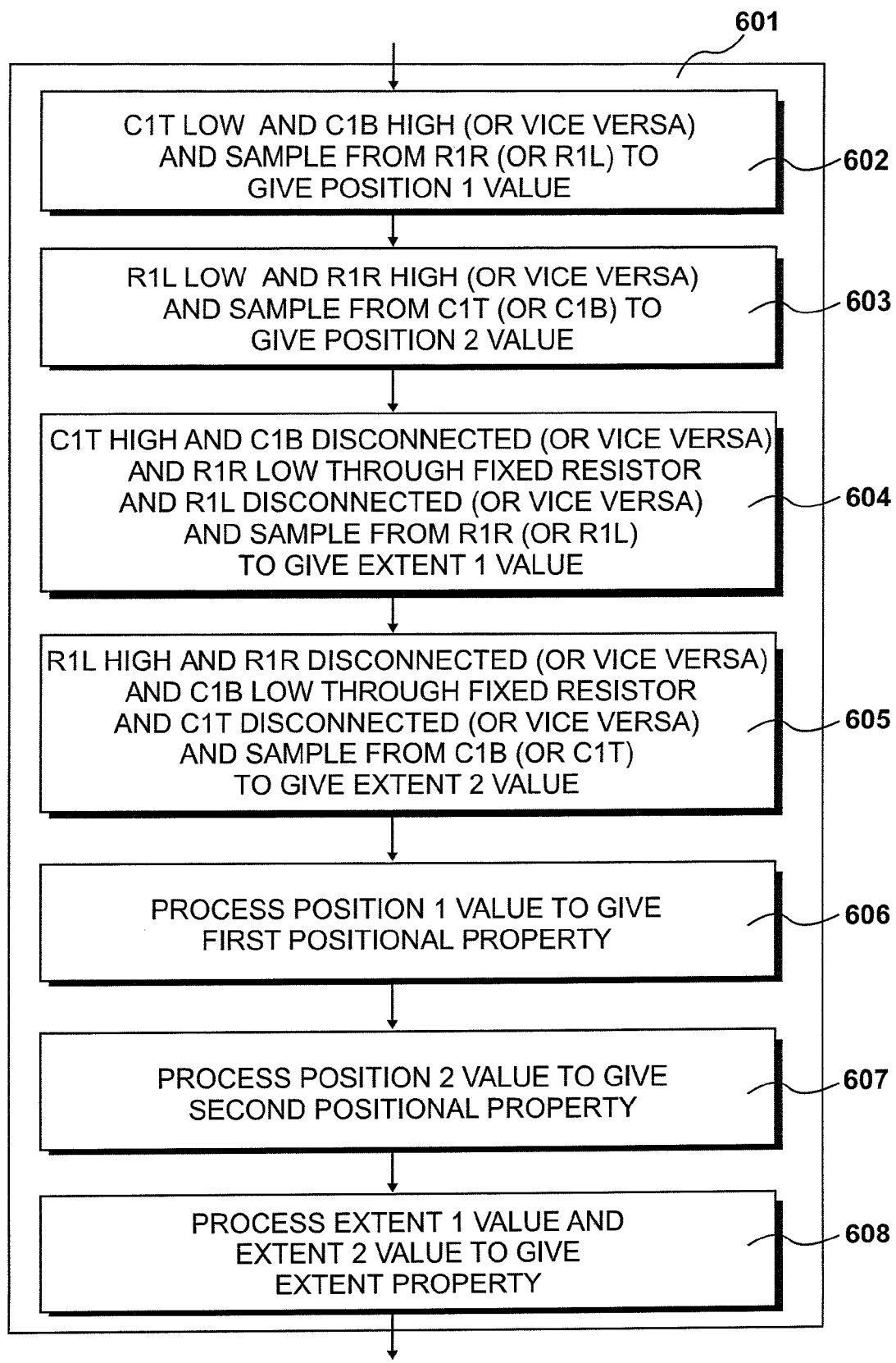
FIG. 6 shows steps in a procedure for generating first and second positional properties and an extent property of a mechanical interaction with a sensor having a four-terminal electrical configuration as described with reference to FIG. 5.

FIG. 6 shows steps in a procedure 601 for generating first and second positional properties and an extent property of a mechanical interaction with a sensor having the four-terminal electrical configuration of FIG. 5.

At step 602, the electrical arrangement of 501 of FIG. 5 is executed and a V1 measurement is made, to give a first positional value. At step 603, the electrical arrangement of 502 of FIG. 5 is executed and a V2 measurement is made, to give a second positional value. At step 604, the electrical arrangement of 503 of FIG. 5 is executed and a V3 measurement is made, to give a first extent value. At step 605, the electrical arrangement of 504 of FIG. 5 is executed and a V4 measurement is made, to give a first extent value. At step 606, the first positional value is processed to give a first positional property. This step may however be performed at any time after step 602. At step 607, the second positional value is processed to give a second positional property. This step may however be performed at any time after step 603. At step 608, the first extent value and the second extent value are processed in combination to give an extent property. This step may however be performed at any time after steps 604 and 605.

FIGS. 7-11

FIGS. 7-11 each shows a different arrangement of a plurality of conductive layers utilisable in a sensing zone, each arrangement comprising at least one layer comprising a qtc material.

As previously stated, a conductive layer comprising a qtc material is herein termed a "qtcm layer". A conductive layer not comprising a qtc material is herein termed a "non-qtcm layer". A non-qtcm layer may comprise any other type of conductive material. In an example, a non-qtcm layer comprises carbon.

Figure 7:
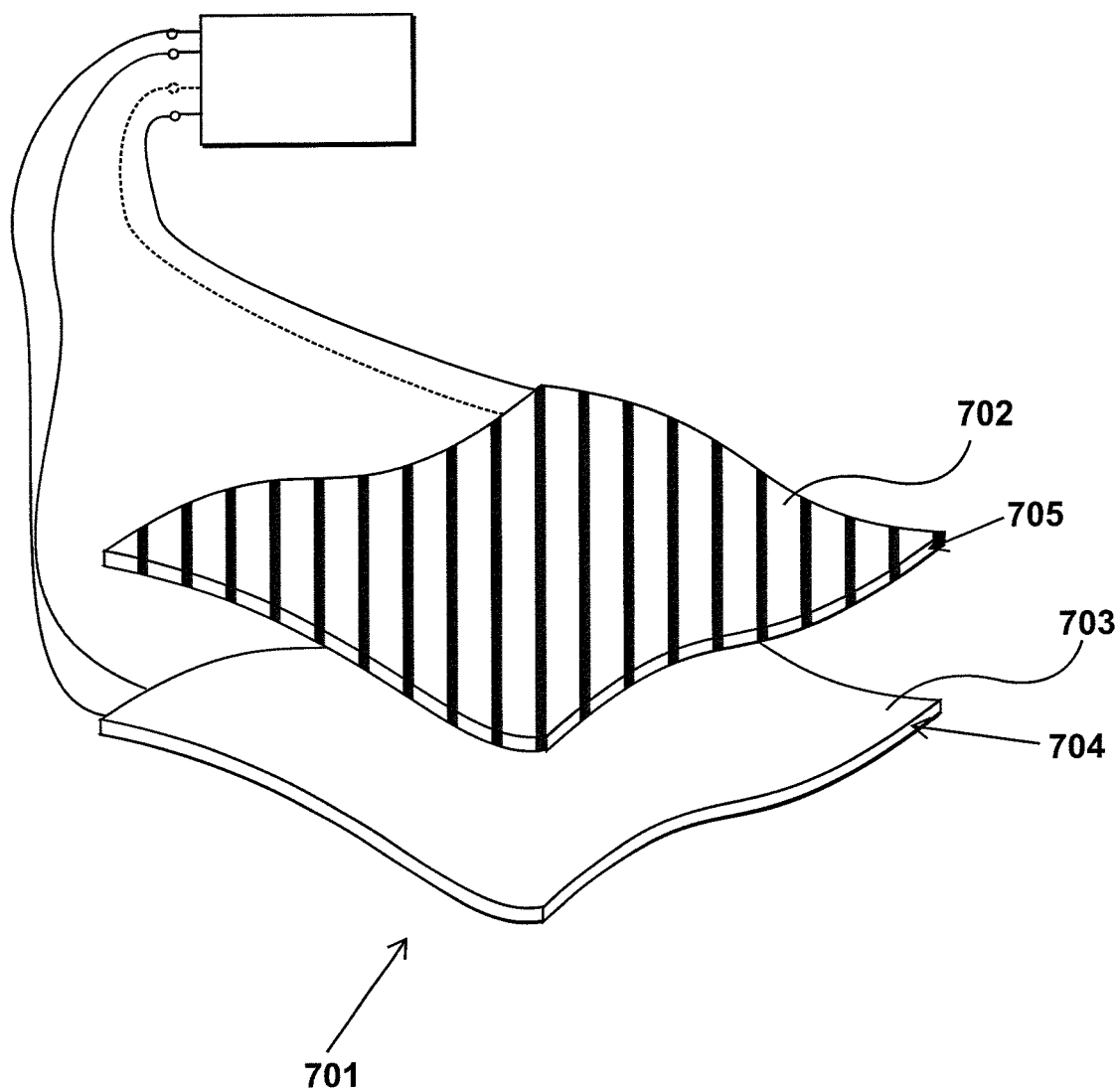
FIGS. 7-11 each shows a different arrangement of a plurality of conductive layers utilisable in a sensing zone, each arrangement comprising at least one layer comprising a qtc material.

In each arrangement of a plurality of conductive layers described with reference to FIGS. 7-11, the outer surface of a first outer layer is in electrical connection with first and second electrical terminals, and the outer surface of the second outer layer is in electrical connection with at least a third electrical terminal to provide a three-terminal sensing arrangement or a four-terminal sensing arrangement (not shown) as described previously. FIG. 7 shows an arrangement of a plurality of conductive layers 701, comprising a first layer 702 that is a qtcm layer and a second layer 703 that is a non-qtcm layer. The first and second layers 702, 703 are configured as first and second separate sheets 704, 705.

Figure 8:
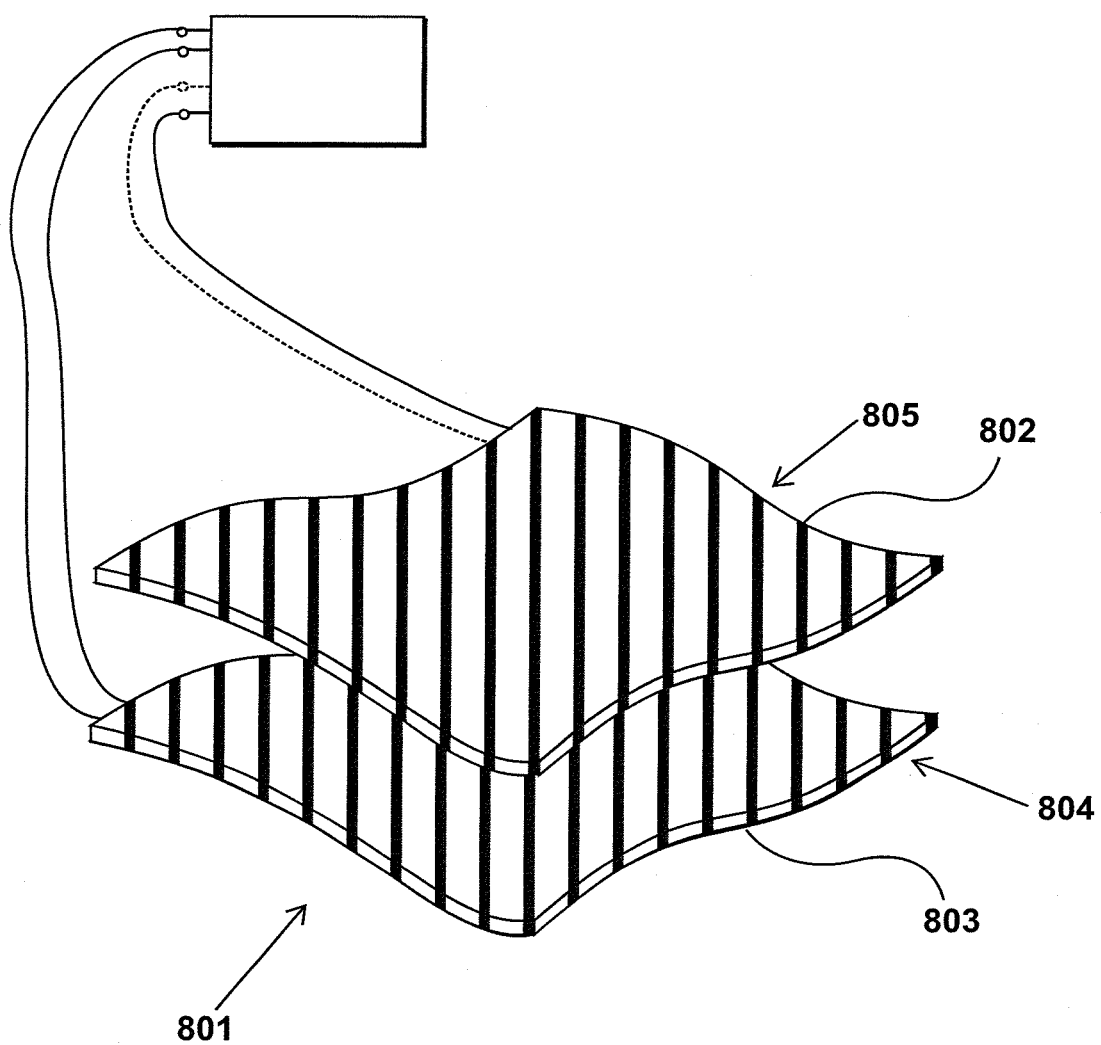

FIG. 8 shows yet another arrangement of a plurality of conductive layers 801, comprising a first layer 802 that is a qtcm layer and a second layer 803 that is also a qtcm layer. The first and second layers 802, 803 are configured as first and second separate sheets 804, 805. This arrangement is similar to the arrangement of FIG. 7 in that only two layers are provided, however, this arrangement differs from the arrangement of FIG. 7 in that two qtcm layers are provided instead of a qtcm layer and a non-qtcm layer. In embodiments in which a plurality of qtcm layers is provided, the same or different type or types of qtc material may be utilised in the provision of each qtcm layer.

Figure 9:
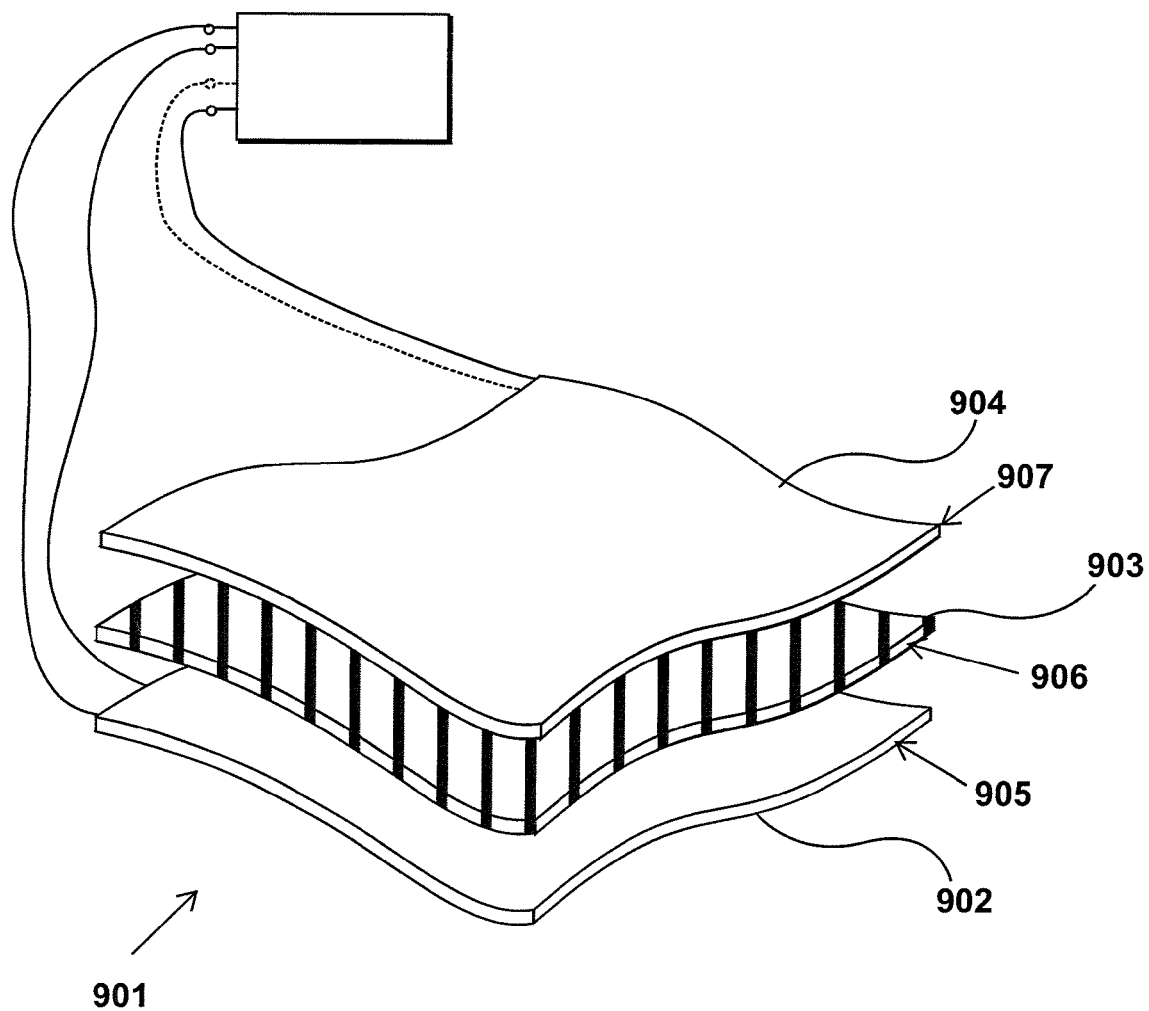

FIG. 9 shows a further alternative arrangement of a plurality of conductive layers 901, comprising a first layer 902 that is a first non-qtcm layer, a second layer 903 that is a qtcm layer and a third layer 904 that is a second non-qtcm layer. In this example, the first, second and third layers 902, 903 and 904 are configured as first, second and third separate sheets 905, 906 and 907.

Figure 10:
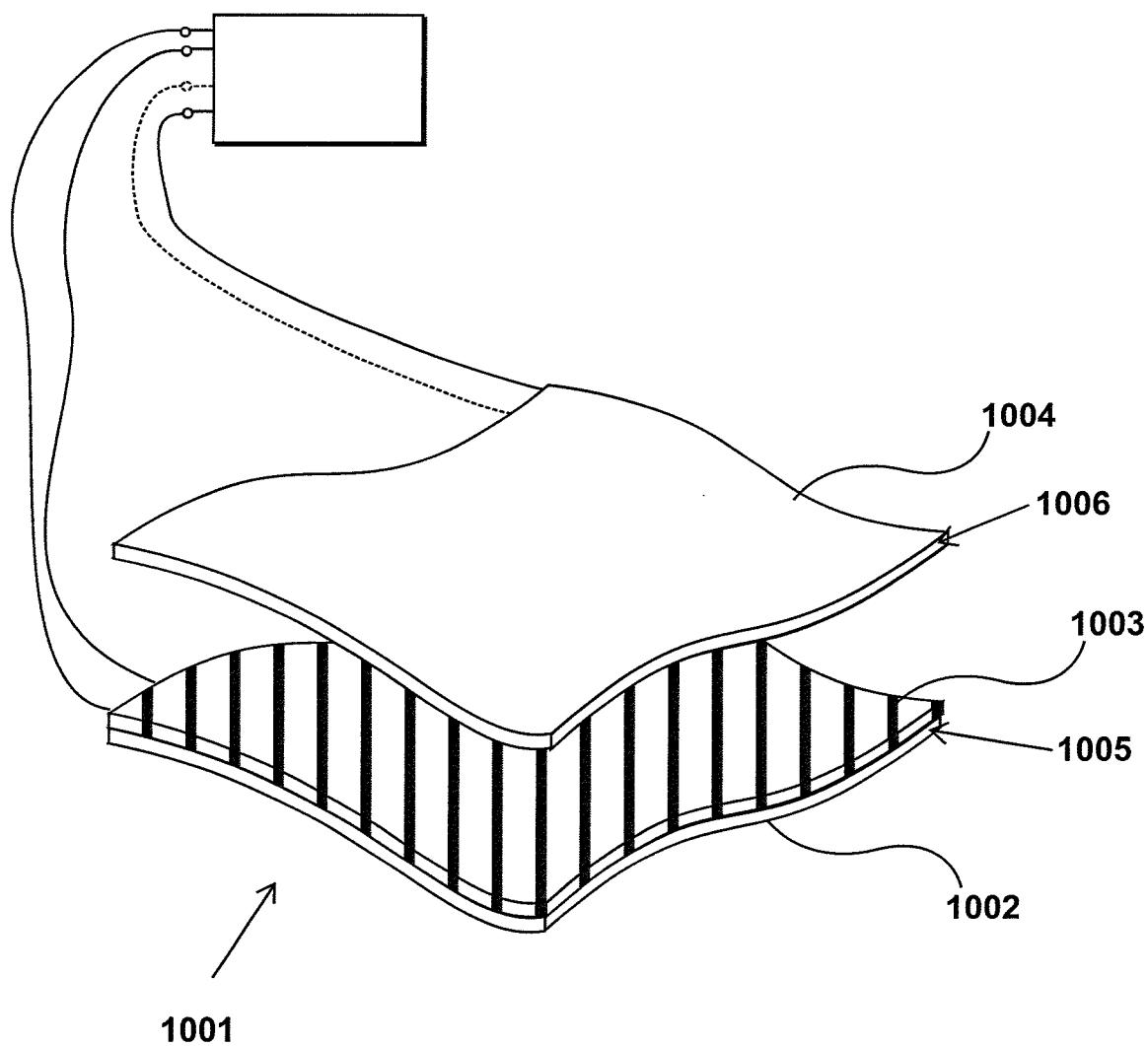

FIG. 10 shows an alternative arrangement of a plurality of conductive layers 1001, comprising a first layer 1002 that is a first non-qtcm layer, a second layer 1003 that is a qtcm layer and a third layer 1004 that is a second non-qtcm layer. In this example, the first and second layers 1002, 1003 are configured as a first separate sheet 1005 and the third layer 1004 is configured as a second separate sheet 1006. In an alternative example, the first layer 1002 is configured as a first separate sheet and the second and third layers 1003, 1004 are configured as a second separate sheet. In both examples, a single qtcm layer is disposed between two non-qtcm layers. This arrangement is similar to the arrangement of FIG. 9 in that a single qtcm layer is disposed between two non-qtcm layers, however, this arrangement differs from the arrangement of FIG. 9 in that one less separate sheet is provided.

Figure 11:
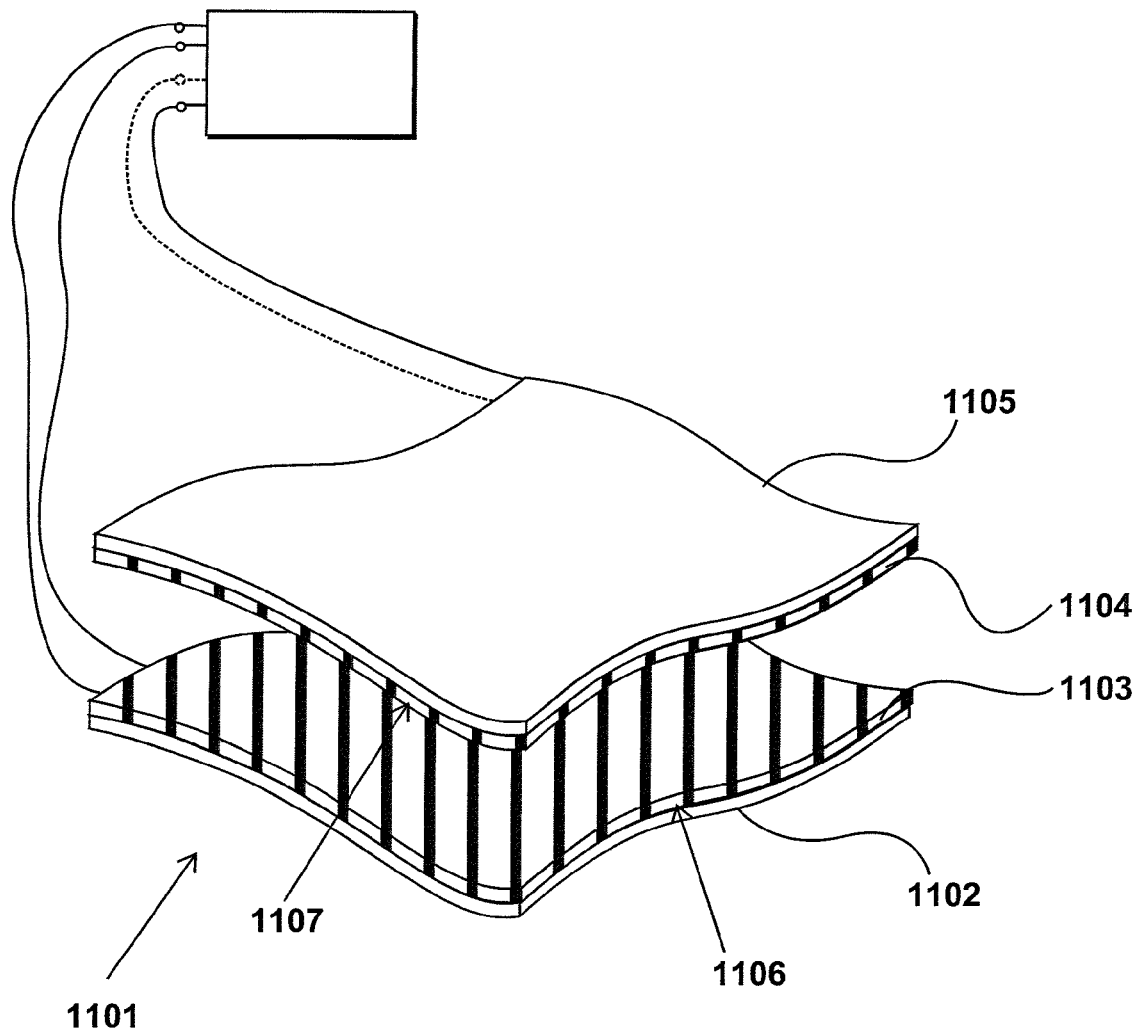

FIG. 11 shows another alternative arrangement of a plurality of conductive layers 1101, comprising a first layer 1102 that is a first non-qtcm layer, a second layer 1103 that is a first qtcm layer, a third layer 1104 that is a second qtcm layer and a fourth layer 1105 that is a second non-qtcm layer. In this example, the first and second layers 1102, 1103 are configured as a first separate sheet 1106 and the third and fourth layers 1104, 1105 are configured as a second separate sheet 1107. Thus, two qtcm layers are disposed between two non-qtcm layers. In the arrangements of FIGS. 9-11, the provision of an intermediate qtcm layer may be perceived as a layer that removes the need for a standoff to normally space conductive layers apart and that also provides useful electrical functionality.

Figure 12:
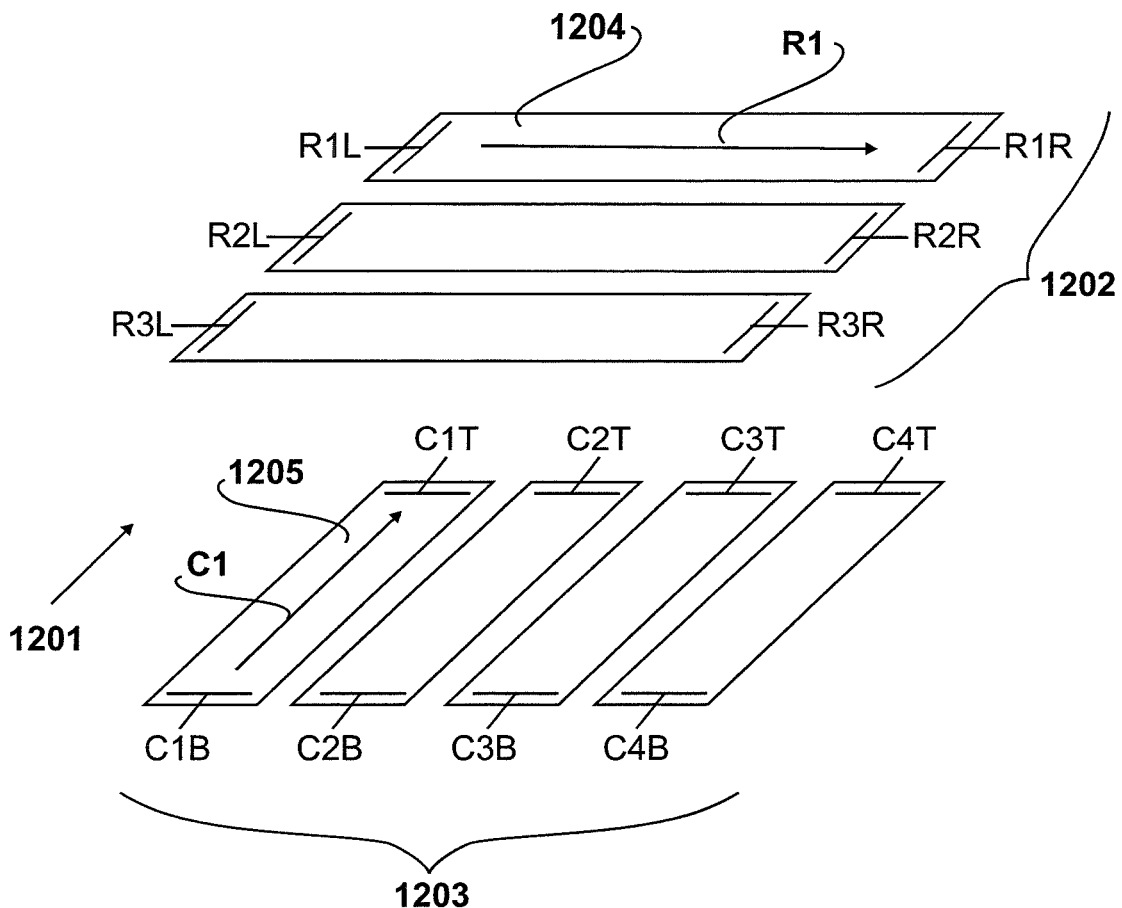
FIG. 12 shows a sensing zone arrangement.

The qtc material may itself be configured to provide a qtcm layer, which as described above may be a separate sheet. Alternatively, a qtcm layer may be fabricated by impregnating a non-conductive material with a qtcm material. The non-conductive material may comprise fibres, which may be textile fibres. Techniques for applying a QTC layer onto another conductive layer, to form a separate sheet, include: coating, painting, brushing, rolling, screen-printing, stencil printing, doctor blading, inkjet printing or application by the Mayer bar technique. A conductive layer utilisable in a sensing zone may be substantially flexible or may be substantially rigid. A conductive layer may be applied to a substrate. A substrate may be substantially flexible or may be substantially rigid. Thus, the sensor may be configured to be substantially flexible or to be substantially rigid. Techniques for applying conductive material onto a substrate, which may be a non-conductive layer or a conductive layer of a plurality of conductive layers include: coating, painting, brushing, rolling, screen-printing, stencil printing, doctor blading, inkjet printing or application by the Mayer bar technique.
FIG. 12

FIG. 12 shows a sensing zone arrangement. A conductive layer may comprise a single conductive area, as previously described, or a plurality of conductive areas as described hereafter.

According to sensing zone arrangement 1201, a first conductive layer, indicated at 1202, presents a plurality of conductive rows and a second conductive layer, indicated at 1203, presents a plurality of conductive columns. Each row is electrically insulated from the others, and similarly each column is electrically insulated from the others.

Each row has a first electrical terminal and a second electrical terminal in electrical connection therewith and configured to allow an electrical potential gradient to be established between said first electrical terminal and said second electrical terminal, in a first direction.

For example, row 1204 has a first electrical terminal R1L and a second electrical terminal R1B in electrical connection therewith, and configured to allow an electrical potential gradient to be established between them in a first direction R1.

Each column has a third electrical terminal and a fourth electrical terminal in electrical connection therewith and configured to allow an electrical potential gradient to be established between said third electrical terminal and said fourth electrical terminal, in a second direction.

Figure 13:
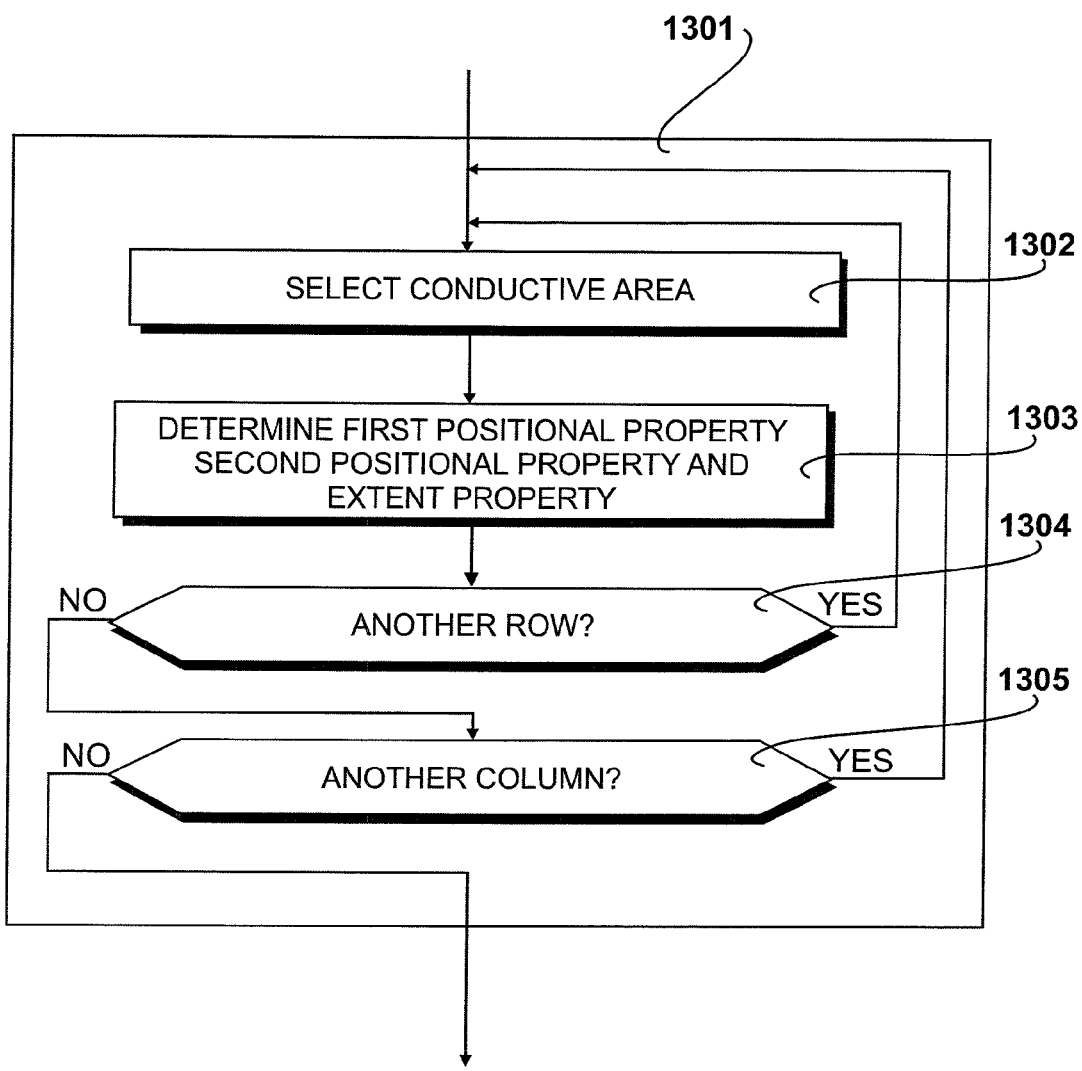
FIG. 13 shows steps in a procedure for generating first and second positional properties and an extent property of a mechanical interaction with a sensor using a four-terminal electrical configuration as described with reference to FIG. 5 and the sensing zone arrangement of FIG. 12.

For example, column 1205 has a third electrical terminal C1B and a second electrical terminal C1T in electrical connection therewith, and configured to allow an electrical potential gradient to be established between them in a first direction C1. As may be expected when using the terminology "rows" and "columns", the rows and columns are parallel to one another within the first and second layers respectively, and directions R1 and C1 are substantially perpendicular.
FIG. 13

FIG. 13 shows steps in a procedure 1301 for generating first and second positional properties and an extent property of a mechanical interaction with a sensor using a four-terminal electrical configuration as described with reference to FIG. 5 and the sensing zone arrangement of FIG. 12.

At step 1302, a conductive area is selected. The conductive area comprises a row and a column.

At step 1303, operations are performed to determine first and second positional properties and an extent property of the conductive area selected at 1302, whereafter step 1304 is entered.

At step 1304, a question is asked as to whether a different row to that selected as part of the conductive area selected at step 1302 is to be interrogated. If the question asked at step 1304 is answered in the affirmative, step 1302 is again entered at which a different conductive area for interrogation is selected. Alternatively, if the question asked at step 1304 is answered in the negative, step 1305 is entered. At step 1305, a question is asked as to whether a different column to that selected as part of the conductive area selected at step 1302 is to be interrogated. If the question asked at step 1305 is answered in the affirmative, step 1302 is again entered at which a different conductive area for interrogation is selected.

Alternatively, if the question asked at step 1305 is answered in the negative, interrogation ceases.

Figure 14:
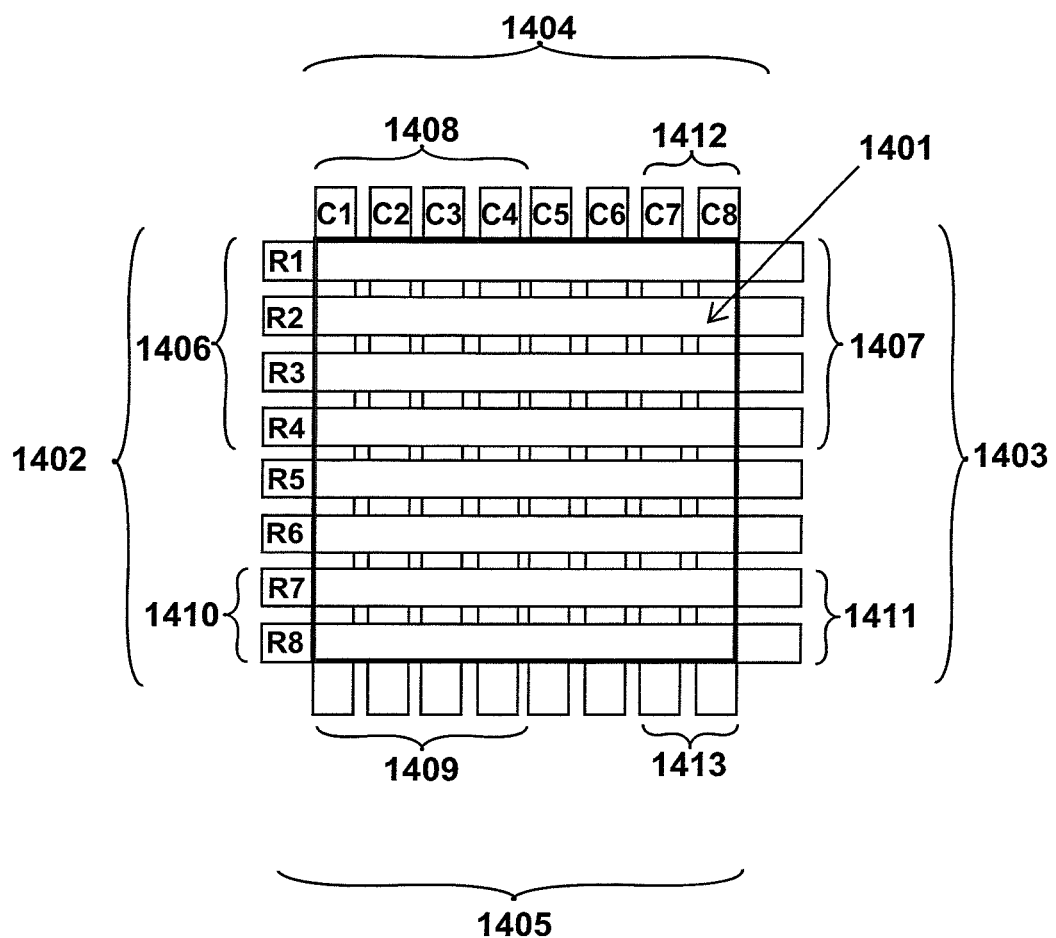
FIG. 14 shows a sensing zone provided by a matrix of rows and columns.

Thus, the routine of 1301 provides for the cycling through of each available row in combination with a particular column until the operations performed at step 1303 have been performed for all the available row and column combinations. In this way, the routine of 1301 provides for the cycling through of all available conductive area combinations.
FIG. 14

FIG. 14 shows a sensing zone 1401, provided by a matrix of rows and columns. In this illustrated example, sensing zone is provided by a matrix of eight rows, rows R1-R8, and eight columns, columns C1-C8. Each row R1-R8 has a first electrical terminal and a second electrical terminal in electrical connection therewith and configured to allow an electrical potential gradient to be established between said first electrical terminal and said second electrical terminal, in a first direction. Each column C1-C8 has a third electrical terminal and a fourth electrical terminal in electrical connection therewith and configured to allow an electrical potential gradient to be established between said third electrical terminal and said fourth electrical terminal, in a second direction that is substantially perpendicular to said first direction. As will described in further detail below, it is possible to select conductive zones of the sensing zone 1401.

As indicated at 1402, the electrical terminals at the same end of rows R1-R8 may be electrically grouped, and, as indicated at 1403, the electrical terminals at the other end of rows R1-R8 may be electrically grouped. In this way, for sensing purposes, R1-R8 may be electrically grouped. Similarly, as indicated at 1404, the electrical terminals at the same end of columns C1-C8 may be electrically grouped, and, as indicated at 1405, the electrical terminals at the other end of columns C1-C8 may be electrically grouped. In this way, for sensing purposes, columns C1-C8 may be electrically grouped. With the rows R1-R8 electrically grouped in this way and the columns C1-C8 electrically grouped in this way, the largest available conductive zone of the sensing zone 1401 is represented. It is possible to selectively electrically group a plurality of adjacent rows or a plurality of adjacent columns to achieve smaller conductive zones of the sensing zone 1401.

For example, as indicated at 1406 and 1407, it is possible to electrically group four adjacent rows, which is half the number of rows of the sensing zone 1401. Similarly, as indicated at 1408 and 1409, it is possible to electrically group four adjacent columns, which is half the number of columns of the sensing zone 1401. Pairs of adjacent rows or columns may be selectively electrically grouped, as indicated at 1410 and 1411 for rows and at 1412 and 1413 for columns.

Figure 15:
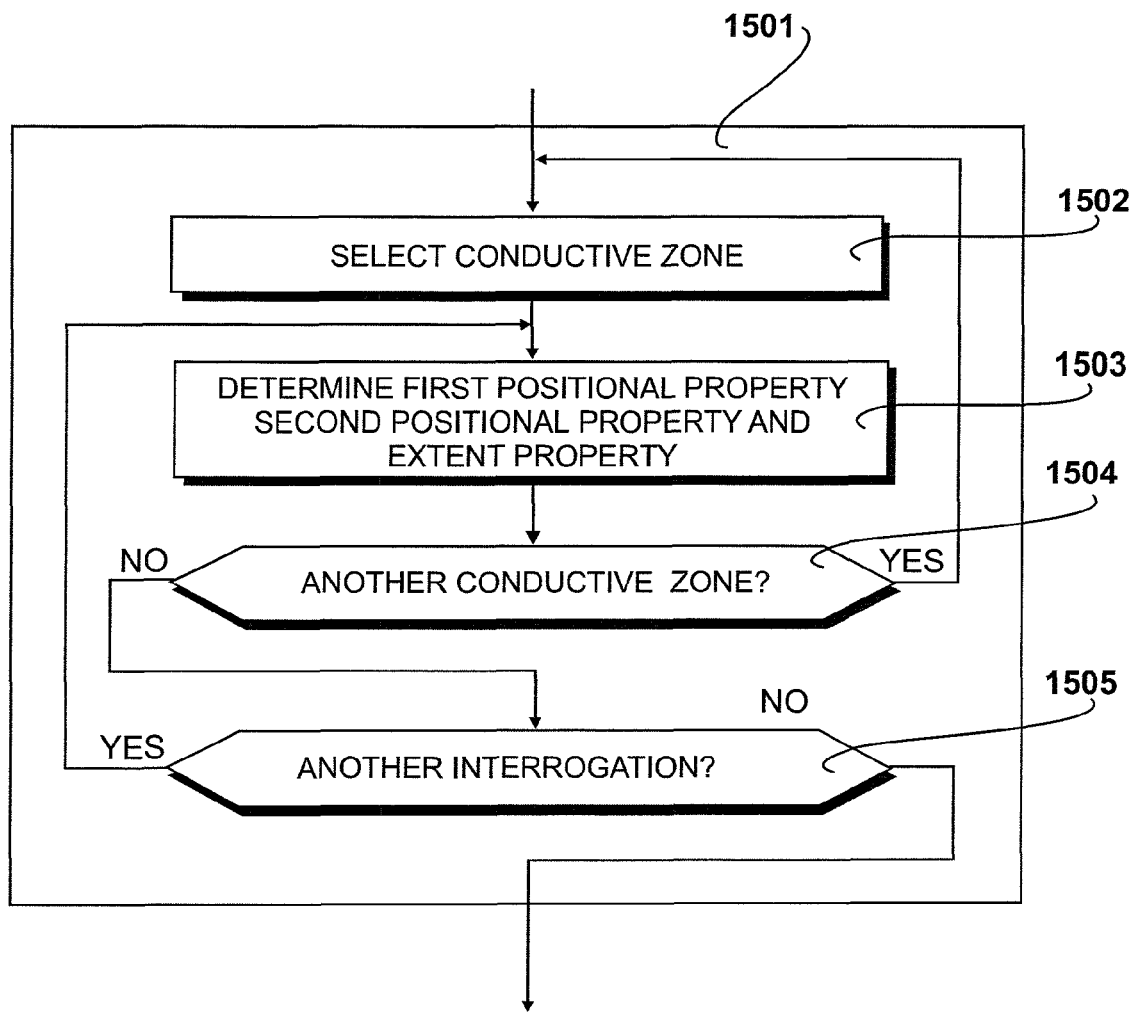
FIG. 15 shows steps in a procedure for generating first and second positional properties and an extent property of a mechanical interaction with a sensor using a four-terminal electrical configuration as described with reference to FIG. 5 and the sensing zone arrangement of FIG. 14.

The selectivity of conductive zones of the sensing zone 1401 provides for a method of detection of a mechanical interaction and a method of determining positional and extent properties of that mechanical interaction.
FIG. 15

FIG. 15 shows steps in a procedure 1501 for generating first and second positional properties and an extent property of a mechanical interaction with a sensor using a four-terminal electrical configuration as described with reference to FIG. 5 and the sensing zone arrangement of FIG. 14.

At step 1502, a conductive zone is selected.

At step 1503, operations are performed to determine first and second positional properties and an extent property of the conductive area selected at 1502, whereafter step 1504 is entered.

At step 1504, a question is asked as to whether a different conductive zone to that selected at step 1502 is to be interrogated. If the question asked at step 1504 is answered in the affirmative, step 1502 is again entered at which a different conductive zone for interrogation is selected. Alternatively, if the question asked at step 1504 is answered in the negative, step 1505 is entered. At step 1505, a question is asked as to whether the operations performed at step 1503 are to be repeated for the same conductive zone. If the question asked at step 1505 is answered in the affirmative, step 1503 is again entered. Alternatively, if the question asked at step 1505 is answered in the negative, step 1505 is entered, interrogation ceases.

The routine of 1501 provides for the largest conductive zone of the overall sensing zone to be selected, and then for the overall sensing zone to be broken down into smaller zones to focus in on the site of the mechanical interaction.

In an application, the largest conductive zone is normally selected and only one of the operations performed at step 1503 is performed in order to detect a mechanical interaction. Following detection of a mechanical interaction, steps 1502-1505 are performed. Upon detection of the removal of the mechanical interaction, the largest conductive zone is again selected in readiness for the detection of the next mechanical interaction.

In this way, detection of a single mechanical interaction within the sensing zone may be performed, and data indicating a positional property and an extent property of the mechanical interaction generated. Moreover, individual detection of multiple simultaneous independent mechanical interactions in different areas within the sensing zone may be performed, and data indicating a positional property and an extent property of each mechanical interaction generated. Thus, a sensor having the construction described herein may be configured to provide a multi-touch sensor.

FIG. 16

Figure 16:
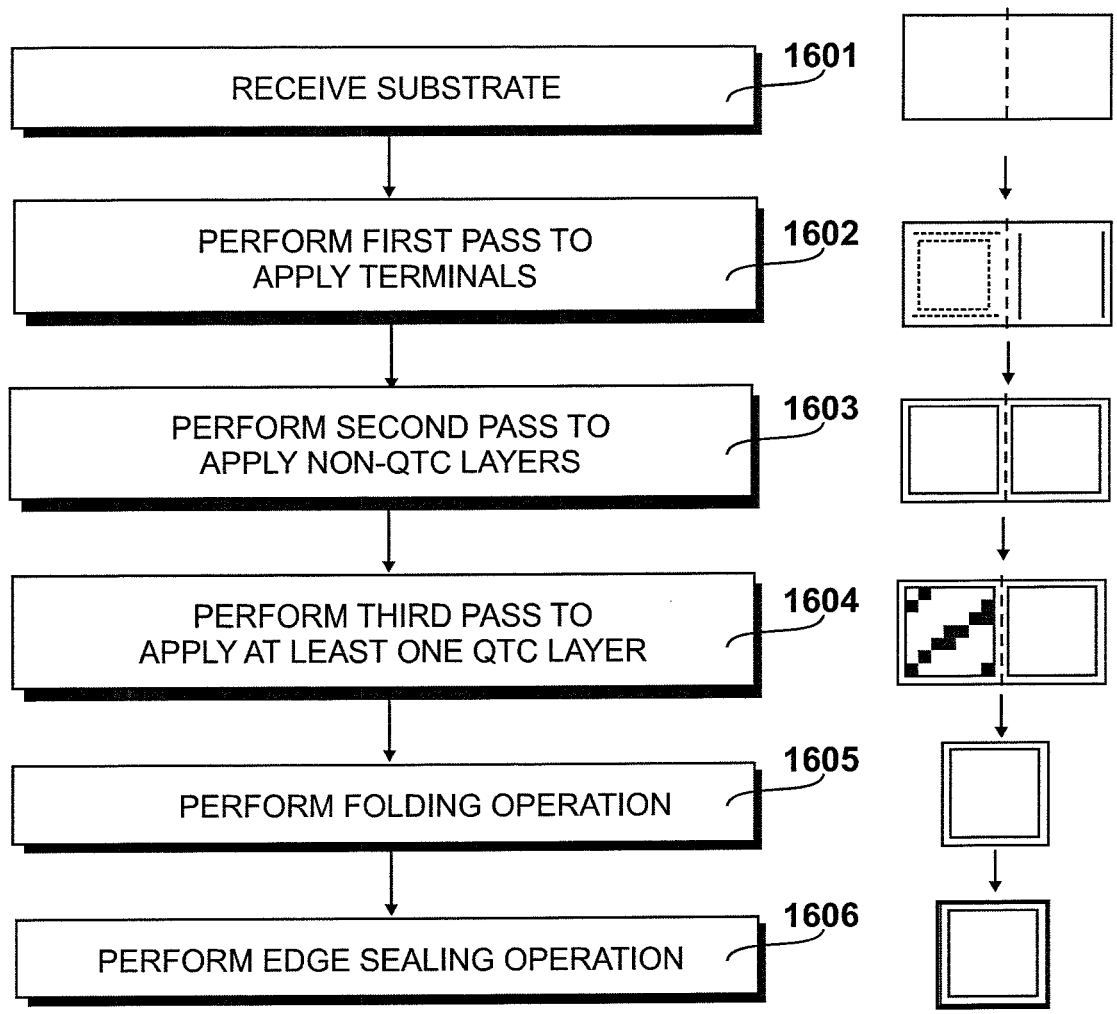
FIG. 16 illustrates an example method of production of a sensor.

FIG. 16 illustrates an example method of production of a sensor having the construction described herein. At step 1601 a substrate is received. In this example, the substrate is a substantially rectangular layer of foldable film. A substantially central axis F defines a left side L and a right side R, with the sides L and R having substantially equal dimensions.

At step 1602, a first operation is performed to apply terminals to the substrate received at step 1601. A pair of terminals is applied to the left side L, in a first orientation, and a pair of terminals is applied to the right side R in a second orientation that is substantially at 90 degrees to the first orientation. In an example, the plurality of electrical terminals of a sensor comprises at least one electrical terminal fabricated from silver.

A second operation is performed at step 1603 to apply an area of non-qtc material to cover the pair of terminals applied to the left side L and to apply a similar area of non-qtc material to cover the pair of terminals applied to the right side R.

At step 1604, a third operation is performed to cover at least one of the left side L area of non-qtc material or the right side R area of non-qtc material applied at step 1603 with qtc material.

A folding operation is then performed at step 1605, to fold the substrate about axis F to bring the left side L and the right side R into alignment. If only one area of qtc material was applied at step 1604, then the arrangement of FIG. 10 would result. If two areas of qtc material were applied at step 1604, then the arrangement of FIG. 11 would result.

At step 1606, an operation is performed to seal the edges of the sensor resultant from step 1605. In an example, the edges of the sensor are sealed with an insulating adhesive. Thereafter, the conductive layers may fall freely within the sensor. As described herein, the brushing together of conductive layers within a sensing zone will not destroy the sensing functionality of a sensor having the construction described herein.

It is to be appreciated that one or two pieces of non-foldable substrate may be received at step 1601 and the operation of step 1601 adapted accordingly to provide the same resulting configuration. In an example, the substrate is fabricated from glass.

Following step 1606, the sensor may then be electrically connected to an interface device configured to apply voltages to, and receive signals from, the terminals applied at step 1602. At this stage, appropriate calibration procedures may be performed, for example to compensate for distortions introduced by edge effects.

It is to be appreciated that the method of manufacture does not require the introduction of standoff to normally space one conductive plane from another, as is seen in prior art sensors.

FIG. 17

Figure 17:
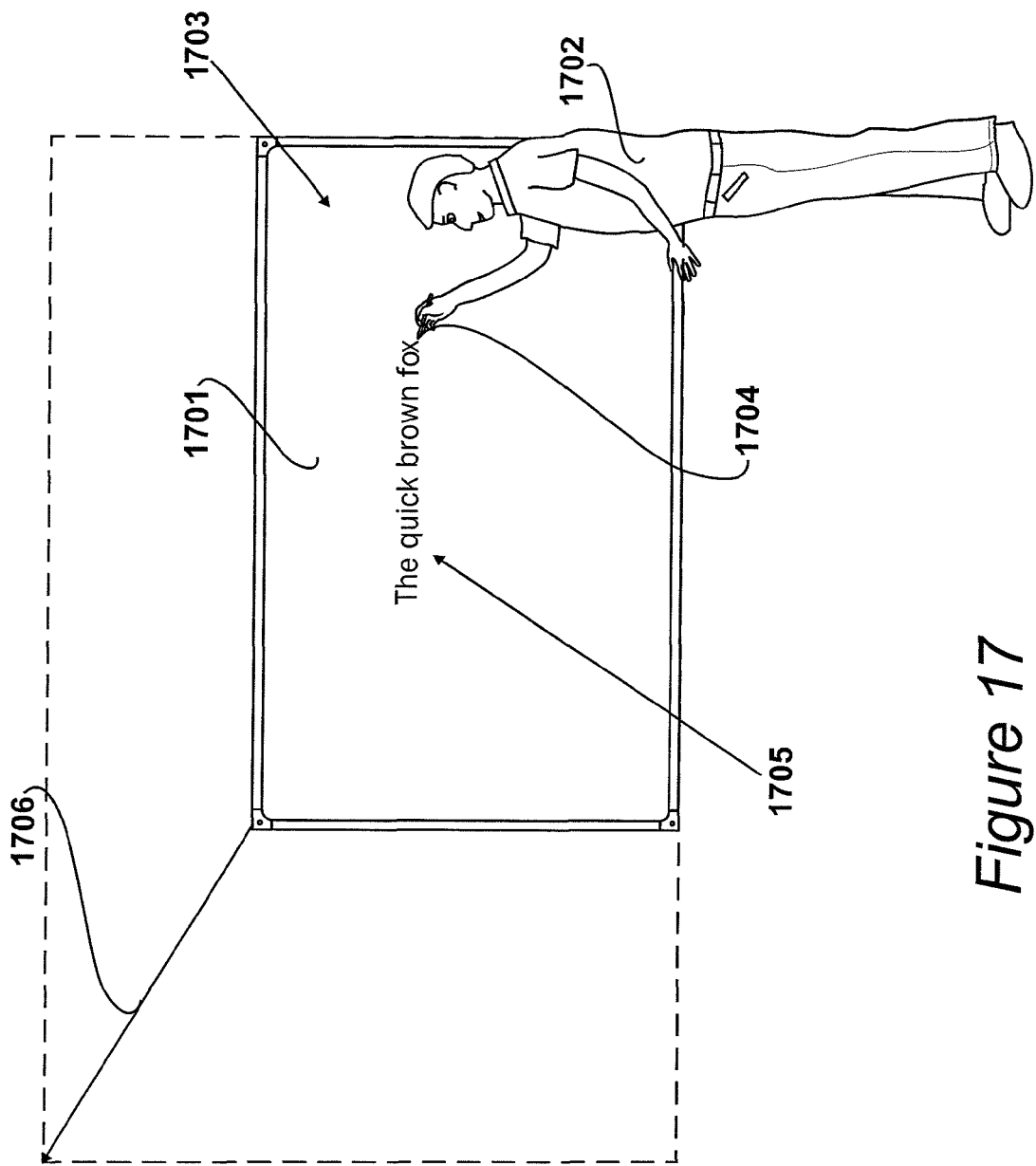
FIG. 17 shows a first application of a sensor having the construction described herein.

FIG. 17 shows a first application of a sensor having the construction described herein. A writing board 1701 allows an operative 1702 to write upon a writing surface 1703 with a stylus 1704. In response, the path of the stylus 1704 over the writing surface 1703 is represented by a trace 1705 of a colour that contrasts with the background colour of the writing board 1701.

Use of a sensor having the construction described herein to provide the functionality of a writing board 1701 is found to provide several advantageous. As indicated stated, the construction of the sensors described herein and the use of the qtcm layer that each comprises negates the need to provide a separator layer during the manufacture of the writing board. This allows for cost and time savings in the construction of the white board. In addition, a problem has been found with prior art writing boards utilising prior art sensors that require a separator layer. An increase in the dimensions of the writing surface of these prior art writing boards results in an increase in the tension required in the layers thereof in order for the separating layer to perform with the same reliability. Thus, physical limitations exist as to the maximum achievable size before the item is rendered unreliable.

However, a sensor having the construction described herein is able to tolerate the touching of conductive layers and hence the need to provide separation between the conductive layers is negated. Thus, the physical limitations of the maximum achievable size of the prior art writing boards is overcome. Therefore, a writing board may now be provided to any scale without loss of functionality. This scalability of the writing board is indicated at 1706. Further, a sensor of the type described herein may be made in any shape, and hence an item in which such a sensor is incorporated may also be of any shape.

FIG. 18

Figure 18:
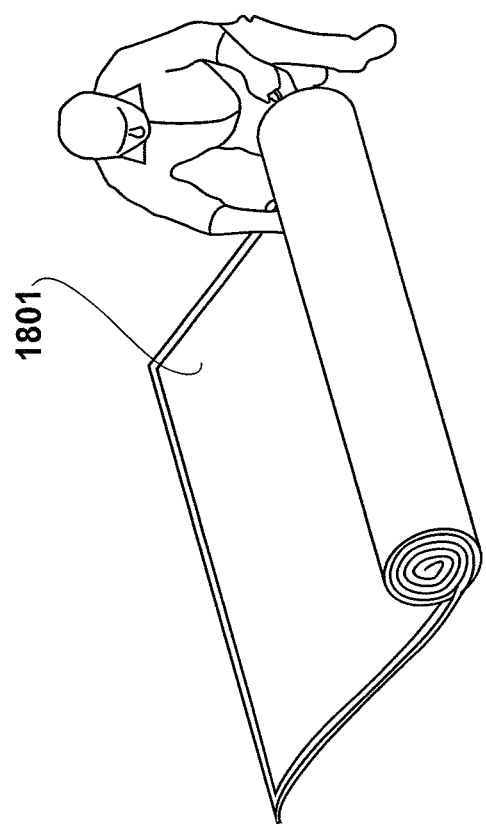
FIG. 18 shows a flexible sensor.

FIG. 18 shows a flexible sensor 1801 having the construction described herein. A prior art flexible sensor is known that utilises first and second textile fabric conductive layers and separating air layer arranged to ensure that the first and second conductive layers are normally spaced apart, yet to allow the first and second conductive layers to make contact during a mechanical interaction. A problem with flexible sensors of this type is that following repeated flexing, the flexible conductive layers experience a degree of set that results in the flexible conductive layer tending towards the contact condition. This leads to false triggering, which can increase to such a level of occurrence that the flexible sensor becomes effectively unusable.

A sensor having the construction described herein is able to allow detection of a mechanical interaction when conductive layers are in contact during the at rest condition of the sensor. In this way, the sensor can withstand flexing or flexing of the type that may, in effect, press the conductive layers together. Thus, a sensor having the construction described herein is particularly useful in the production of flexible sensors since the sensor overcomes the false triggering problem. In addition, as discussed above, the sensor may be constructed without the need for a standoff between conductive layers, which serves to simplify the manufacture process, reduce materials and reduce production duration and cost. In turn, a sensor having the construction described herein serves to satisfy ever-growing demand for reliable, affordable, sensors for indicating a positional property and an extent property of a mechanical interaction within a sensing zone.

FIG. 19

Figure 19:
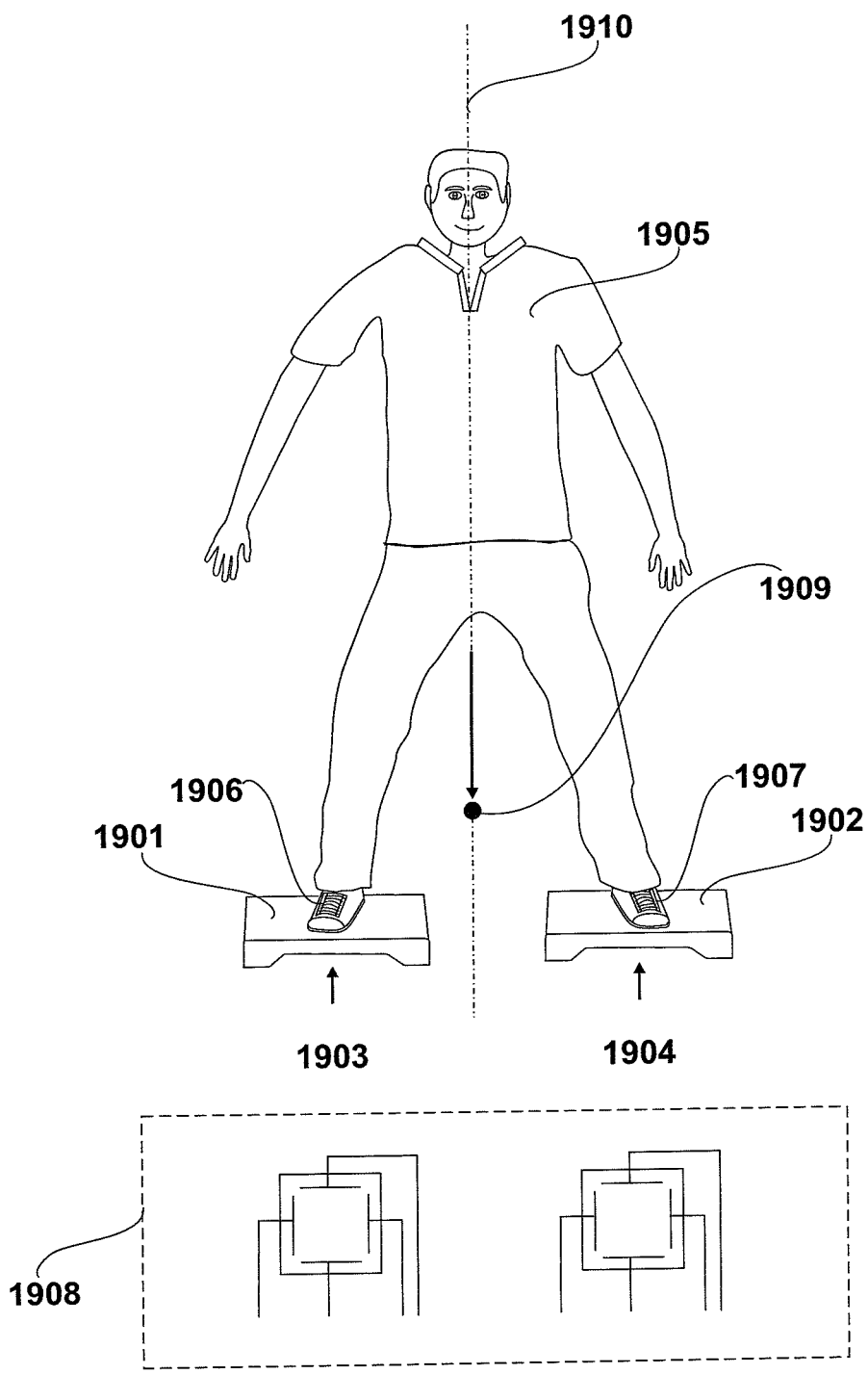
FIG. 19 shows first and second sensors.

A sensor having the construction described herein is usable in applications in which the centre of applied pressure is detectable. FIG. 19 shows a first sensor 1901 and a second sensor 1902, the sensors being incorporated into separate items 1903, 1904. The pair of sensors 1901, 1902 may thus be presented as first and second sensing zones. A person 1905 is shown standing on the sensors 1901, 1902 such that a first foot 1906 is applying pressure upon first sensor 1901 and a second foot 1907 is applying pressure upon second sensor 1902.

Electrical signals may be generated indicating positional and extent properties of a mechanical interaction with each sensor, providing first and second sets of data. This may be achieved by means of the arrangement indicated at 1908. By processing the first and second sets of data in combination, it is possible to provide an indication of a location of a centre of applied pressure, as indicated at 1909. It is to be appreciated that a centre of applied pressure may be indicated in this way for any type of object. The location a centre of applied pressure may be indicated relative to a reference axis 1910, which in this example is at a substantially central position between the two sensors 1901, 1902.

FIG. 20

Figure 20:
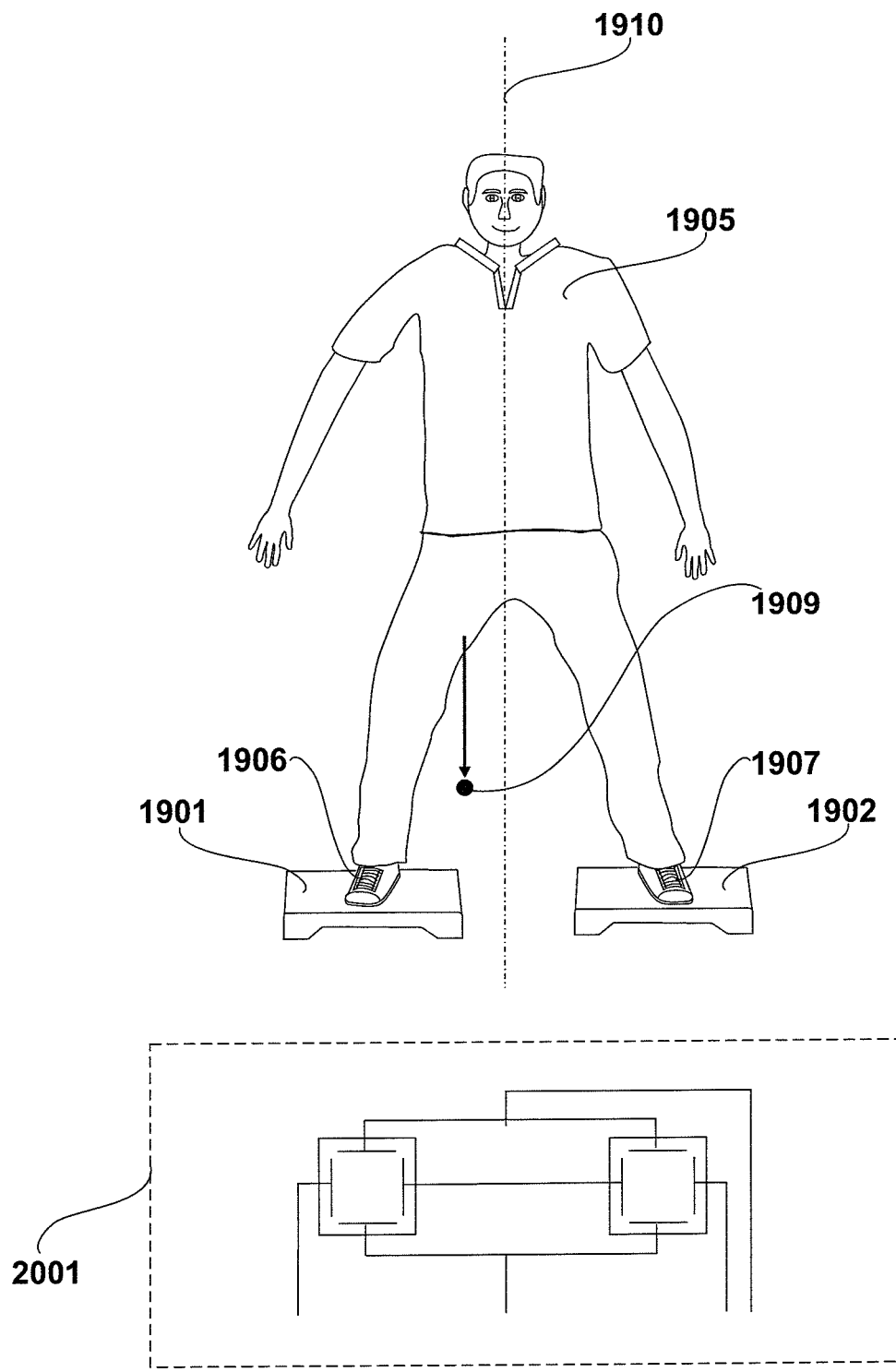
FIG. 20 shows the first and second sensors of FIG. 19 electrically connected to act as a single sensor.

As shown in FIG. 20, the first and second sensors 1901, 1902 of FIG. 19 may be electrically connected to act as a single sensor, as indicated at 2001.

It is to be appreciated that the location of the indicated centre of pressure will vary depending upon the magnitude of pressure applied to each sensor 1901, 1902. In this illustrated example, person 1905 is pressing relatively harder with their right foot 1906 and pressing relatively softer with their left foot 1907. As a result, the indicated location of a centre of applied pressure, as indicated at 1909, is to the side of the substantially central reference axis 1910 closer to the right foot 1906. A similar effect would be achieved by providing the first and second sensors 1901, 1902 in the form of footwear insoles, for example. This type of sensor arrangement may be used as an input sensor for gaming applications. For example, the sensor may be used to provide inputs for play in a golfing game, or any kind of boarding game, such as surfboarding, snowboarding or skateboarding for example.

FIG. 21

Figure 21:
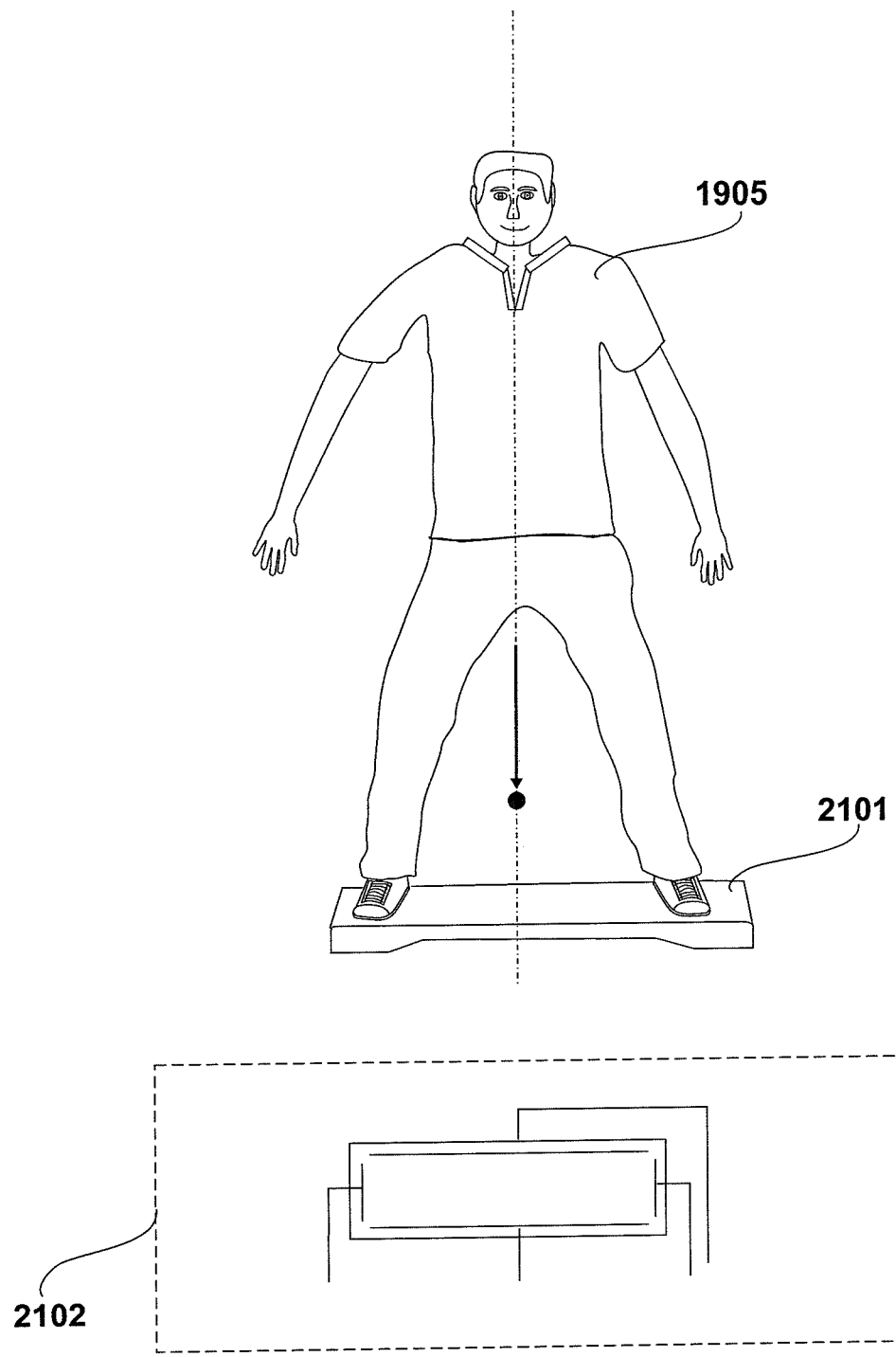
FIG. 21 shows a sensor arranged to detect simultaneous multiple mechanical interactions within a sensing zone.

FIG. 21 illustrates shows a sensor arranged to detect simultaneous multiple mechanical interactions within a sensing zone. Sensor 2101 is arranged to detect the centre of applied pressure during simultaneous multiple mechanical interactions, applied by person 1905, as indicated at 2102. In this example, sensor 2101 presents a substantially rectangular sensing zone and utilises a four-terminal sensing configuration as previously described. Again, an arrangement of the type shown in FIG. 21 may be used to provide an input apparatus for play in a golfing game, or any kind of boarding game, such as surfboarding, snowboarding or skateboarding for example.

FIG. 22

Figure 22:
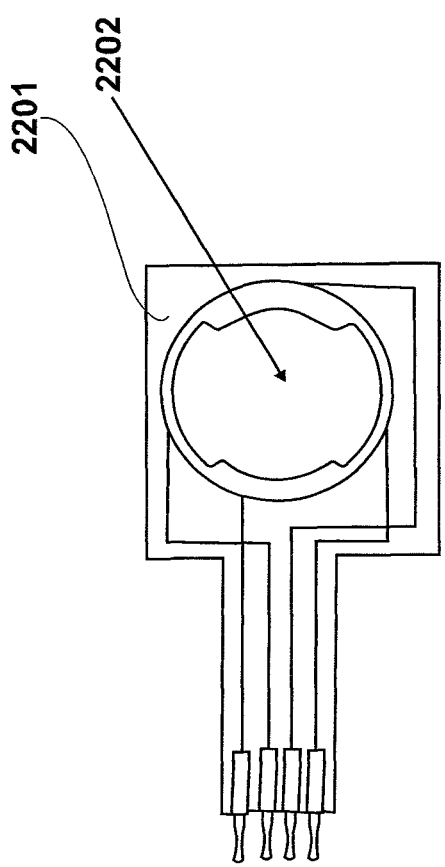
FIG. 22 shows a sensor configured to provide a substantially circular sensing zone.

FIG. 22 shows a sensor 2201 having the construction described herein, which is configured to provide a substantially circular sensing zone 2202. In this illustrated example, the sensor 2201 has the construction described herein has a four-terminal sensing arrangement for indicating first and second positional properties and an extent property of a mechanical interaction.

FIG. 23

Figure 23:
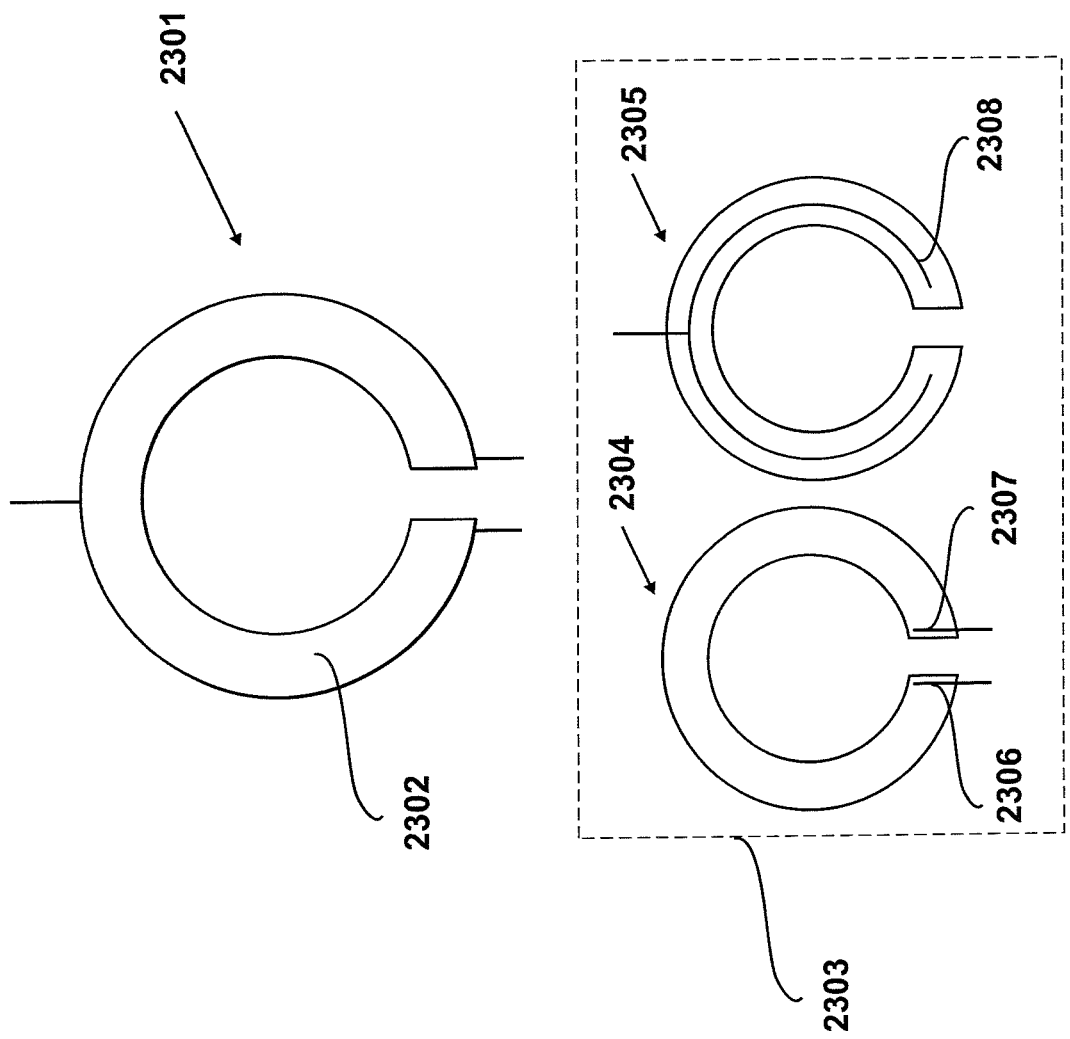
FIG. 23 shows a sensor configured to present a substantially annular sensing zone.

FIG. 23 shows a sensor 2301 having the construction described herein, which presents a substantially annular sensing zone 2302. In this example, sensor 2301 has the construction described herein and has a three-terminal sensing arrangement for indicating a positional property and an extent property of a mechanical interaction. A sensor of this type that presents a substantially annular sensing zone is suitable for providing a 'scroll wheel' function. As illustrated at 2303, sensor 2301 comprises a first substantially annular conductive layer 2304 and a second substantially annular conductive layer 2305. The first conductive layer 2304 is provided with first and second electrical terminals 2306 and 2307, towards the ends of the substantially annular conductive region 2302, and the second conductive layer 2305 is provided with a third electrical terminal 2308 that extends around the substantially annular conductive region 2302. Thus, the first, second and third electrical terminals 2306, 2307 and 2308 are each line terminals, with the third electrical terminal 2308 having a greater length than the length of the first and second electrical terminals 2306, 2307.

FIG. 24

Figure 24:
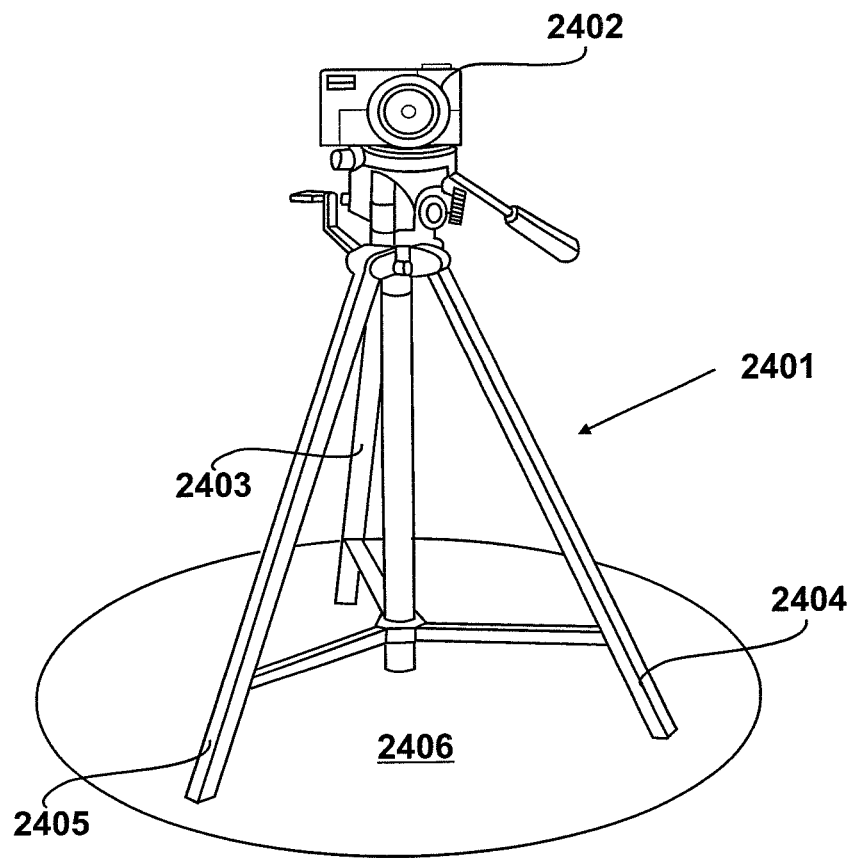
FIG. 24 shows a further application for a two-dimensional sensing zone.
Figure 24:
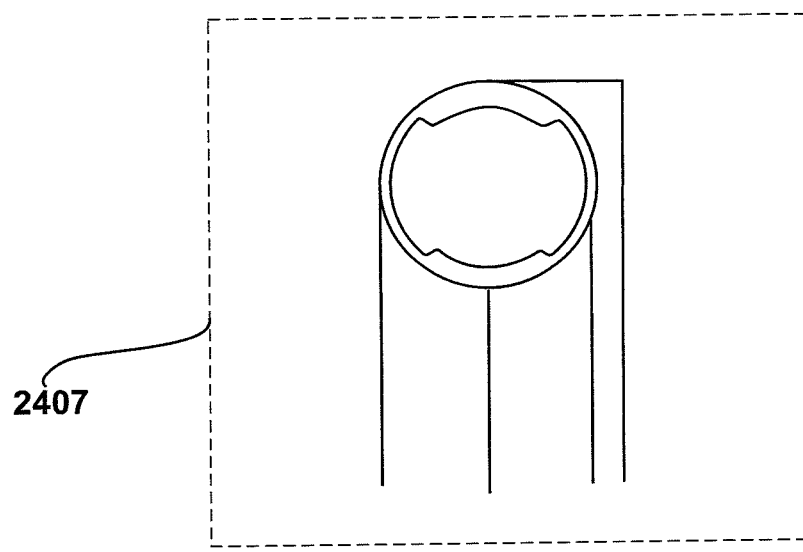

A further application for a two-dimensional sensing zone is shown in FIG. 24. A tripod 2401, in this example for an image capture device 2402, has legs 2403, 2404 and 2405. A sensor 2406 having the construction described herein is located underneath the tripod legs 2403, 2404 and 2405. The sensor 2406 enables feedback to be provided regarding the relative support that each of the tripod legs 2403, 2404 and 2405 is providing. Again, as indicated at 2407, or as described with reference to FIGS. 20 and 21, a centre of pressure of the combination of the tripod 2401 and the image capture device 2202 it is supporting, can be obtained.

FIG. 25

Figure 25:
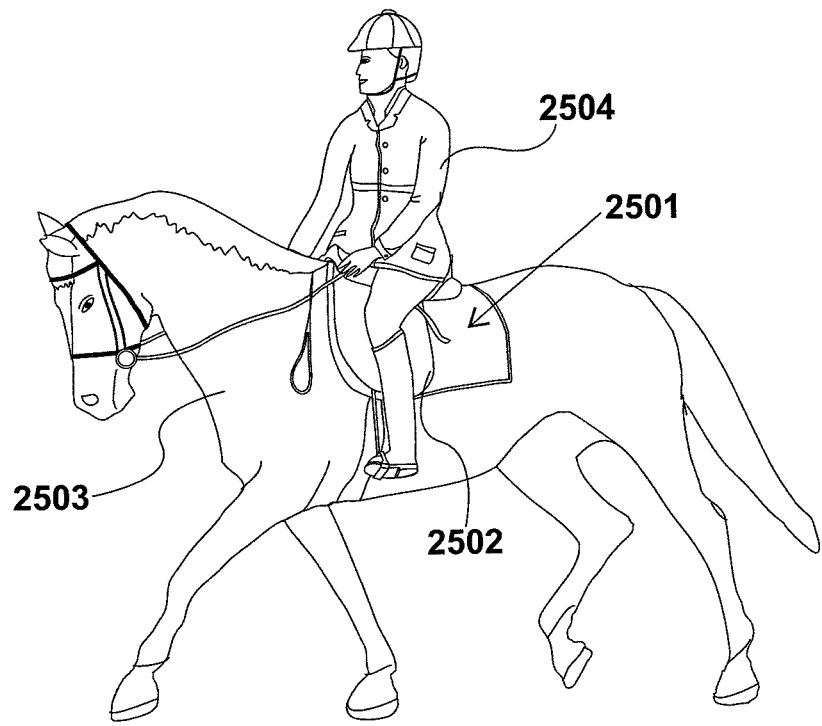
FIG. 25 shows a sensor having a substantially three-dimensional sensing zone.

A sensor having the construction described herein may present a sensing zone that is sensing zone substantially two-dimensional or substantially three-dimensional. FIG. 25 shows an example application of a sensor having the construction described herein and having a substantially three-dimensional sensing zone. In this illustration, a three-dimensional sensing zone 2501 is included in a saddle 2502. In the shown scenario, a horse 2303 is wearing the saddle 2502 and the horse is under the control of a rider 2504. The sensor generates electrical signals in response to physical interactions with the sensing zone 2501 by rider 2504 that indicate positional and extent properties of those physical interactions. This enables dynamic profiling of the action of the rider upon the horse. A sensor or an arrangement of sensors as described herein may be arranged to be worn by a person or an animal. For example, a sensor or an arrangement of sensors as described herein may be arranged to be worn on each foot of a four-legged animal to determine whether the animal is applying greater pressure by the front feet or the rear feet.

A three-dimensional sensor may be manufactured by a moulding process, and may be constructed from a plurality of parts that are subsequently assembled together. However, it is to be appreciated that care must be taken to ensure that no undesirable internal pressures within the sensor that would affect proper operation are created during the production process.

FIG. 26

Figure 26:
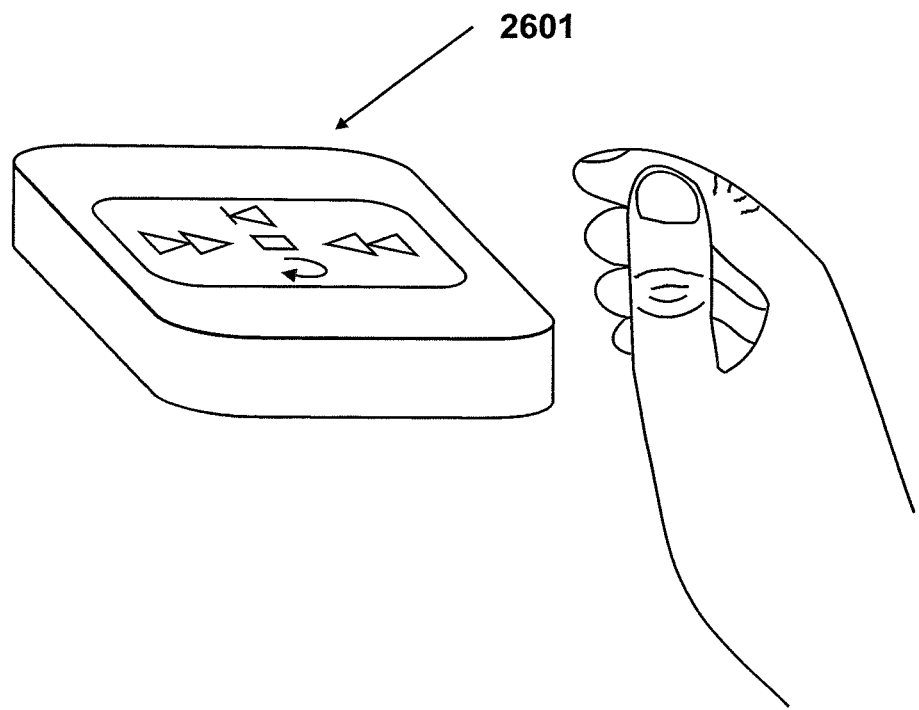
FIG. 26 shows a controller configured to recognise presses and gestures.

A controller 2601 is shown in FIG. 26, is configured to recognise presses and gestures. The controller may be arranged to provide controls for an audio playback device and/or to provide menu navigation of a mobile telephone or a computing device. In an example, a first sensing zone is provided to detect presses, for example where button regions are indicated, and a second sensing zone is provided to detect gestures, for example where a scroll region is indicated. A controller may be incorporated into another device or may incorporate a wireless interface to provide remote control functionality. Thus, sensors having the construction described are relatively practical and cheap to produce, yet are durable and provide for a range of mechanical interaction data analysis.

Although specific examples of applications of a sensor having the construction described herein are given, a sensor according to the present invention is utilisable in many applications across different fields and devices. For example, a sensor according to the present invention may be used in: sports applications, medical applications, education applications, industrial applications, mobile telephone applications, toys and games applications, wearable items applications, automotive applications, robotic applications, security applications, keyboard and input device applications. A variety of arrangements may be utilised in a mechanical interaction detection device and any combination of sensors as described herein may be incorporated into a single device.

The invention claimed is:

1. A sensor for generating electrical signals indicating a positional property and an extent property of a mechanical interaction within a sensing zone, said sensor comprising a plurality of conductive layers, the plurality of conductive layers being placed on first and second sheets:
    said first sheet carrying a first conductive layer having a first conductive area;
    a first electrical terminal and a second electrical terminal in electrical connection with said first conductive area;
    said first conductive area being configured to enable an electrical potential gradient to be established between said first electrical terminal and said second electrical terminal in a first direction extending across said first conductive layer;
    said second sheet carrying a second conductive layer having a second conductive area;
    a third electrical terminal in electrical connection with said second conductive area;
    said sensor being configured such that an electrical path is established between said first conductive area and said second conductive area during a mechanical interaction within said sensing zone; and
    at least one of said first sheet and said second sheet comprises a pressure-sensitive conductive layer comprising a quantum tunnelling conductance (qtc) material;
    said sensor being configured such that direct electrical contact between said first and second conductive layers is permitted during the absence of a mechanical interaction within said sensing zone.

2. The sensor of claim 1, wherein said third electrical terminal is a sheet terminal.

3. The sensor of claim 1, wherein said second conductive area has a fourth electrical terminal connected thereto and is configured to allow an electrical potential gradient to be established between said third electrical terminal and said fourth electrical terminal, in a second direction that is substantially perpendicular to said first direction.

4. The sensor of claim 3, wherein
    said first conductive layer presents a plurality of conductive rows, each row electrically insulated from the others, each row having a first electrical terminal and a second electrical terminal in electrical connection therewith and configured to allow an electrical potential gradient to be established between said first electrical terminal and said second electrical terminal, in a first direction, and
    said second conductive layer presents a plurality of conductive columns, each column electrically insulated from the others, each column having a third electrical terminal and a fourth electrical terminal in electrical connection therewith and configured to allow an electrical potential gradient to be established between said third electrical terminal and said fourth electrical terminal, in a second direction that is substantially perpendicular to said first direction.

5. A method of generating electrical signals indicating a positional property and an extent property of a mechanical interaction within a sensing zone of a sensor, comprising the steps of:
    receiving the sensor of claim 3,
    establishing an electric potential gradient across said first conductive layer, between said first electrical terminal and said second electrical terminal, in said first direction,
    receiving a first voltage from one of said third electrical terminal and said fourth electrical terminal of said second conductive layer, to produce a first positional value,
    processing said first positional value to produce a first positional value of a mechanical interaction,
    establishing an electric potential gradient across said second conductive layer, between said third electrical terminal and said fourth electrical terminal, in said second direction,
    receiving a second voltage from one of said first electrical terminal and said second electrical terminal of said first conductive layer, to produce a second positional value,
    processing said second positional value to produce a second positional value of a mechanical interaction,
    establishing an electric potential from one of said first electrical terminal and said second electrical terminal of said first conductive layer, to produce a first current,
    measuring said first current from one of said third electrical terminal and said second electrical terminal of said second conductive layer, to produce a first current value,
    establishing an electric potential from the other of said first electrical terminal and said second electrical terminal of said first conductive layer, to produce a second current,
    measuring said second current from the other of said third electrical terminal and said fourth electrical terminal of said second conductive layer, to produce a second current value, and
    processing said second current value in combination with said first current value to produce an extent property of a mechanical interaction.

6. The sensor of claim 1, wherein a first pressure-sensitive conductive layer comprising a quantum tunnelling conductance (qtc) material provides said first conductive layer, a second pressure-sensitive conductive layer comprising a quantum tunnelling conductance (qtc) material provides said second conductive layer, and said sensor comprises said first conductive layer and said second conductive layer only.

7. The sensor of claim 1, wherein a pressure-sensitive conductive layer provides a third conductive layer that is disposed between said first conductive layer and said second conductive layer.

8. The sensor of claim 7, wherein a second pressure-sensitive conductive layer comprising a quantum tunnelling conductance (qtc) material provides a fourth conductive layer, and said fourth conductive layer and said second conductive layer are configured as a separate sheet to said first sheet.

9. The sensor of claim 1, wherein said extent property is one of:

magnitude of applied force, magnitude of applied pressure, area of mechanical interaction.

10. The sensor of claim 1, wherein said sensing zone is non-planar, said sensor being constructed of a plurality of molded parts assembled together.

11. The sensor of claim 1, wherein at least one conductive layer comprises textile fibres.

12. A method of generating electrical signals indicating a positional property and an extent property of a mechanical interaction within a sensing zone of a sensor, comprising the steps of:

receiving the sensor of claim 1, establishing an electric potential gradient across said first conductive layer, between said first electrical terminal and said second electrical terminal, in said first direction, receiving a first voltage from said third electrical terminal, to produce a first positional value, processing said first positional value to produce a first positional property of a mechanical interaction, establishing an electric potential from one of said first electrical terminal and said second electrical terminal of said first conductive layer, to produce a first current, measuring said first current from said third electrical terminal of said second conductive layer, to produce a first current value, establishing an electric potential from the other of said first electrical terminal and said second electrical terminal of said first conductive layer, to produce a second current, measuring said second current from said third electrical terminal of said second conductive layer, to produce a second current value, and processing said second current value in combination with said first current value to produce an extent property of a mechanical interaction.

* * * * *